United States Patent [19]
Miyazaki et al.

[11] Patent Number: 6,125,428
[45] Date of Patent: Sep. 26, 2000

[54] APPARATUS FOR REPRODUCING MULTIMEDIA DATA, METHOD FOR REPRODUCING MULTIMEDIA DATA, AND RECORD MEDIA CONTAINING MULTIMEDIA DATA REPRODUCTION PROGRAM

[75] Inventors: Masaya Miyazaki, Ikedashi; Kiyoshi Owada; Nobuyuki Enoki, both of Hirakatashi, all of Japan

[73] Assignee: Matsushita Electric Industrial Co., Ltd., Japan

[21] Appl. No.: 09/028,486

[22] Filed: Feb. 24, 1998

[30] Foreign Application Priority Data

Feb. 28, 1997 [JP] Japan .................................. 9-046402

[51] Int. Cl.$^7$ ...................................................... G06F 12/00
[52] U.S. Cl. ........................... 711/112; 711/111; 711/154; 348/7; 707/205; 369/30
[58] Field of Search ........................... 711/111, 112, 114, 711/154; 348/7; 369/30–40; 707/200, 205

[56] References Cited

U.S. PATENT DOCUMENTS

| | | | |
|---|---|---|---|
| 5,805,538 | 9/1998 | Kamada et al. | 369/34 |
| 5,829,044 | 10/1998 | Sono | 711/156 |
| 5,943,304 | 8/1999 | Kamada et al. | 369/34 |

FOREIGN PATENT DOCUMENTS

0774709A2 5/1997 European Pat. Off. ........ G06F 03/00
0862178A2 9/1998 European Pat. Off. ........ G11B 27/00

OTHER PUBLICATIONS

Brubek, D. Et al., Hierarchical Storage Management in a Distributed VOD System, IEEE online Documents, pp. 37–47, 1996.

Lin, Y. et al., A Hierarchical Network Storage Architecture for Video–on–Demand Services, IEEE Transactions, pp. 355–364, 1996.

*Primary Examiner*—John W. Cabeca
*Assistant Examiner*—Pierre-Michel Bataille
*Attorney, Agent, or Firm*—Parkhurst & Wendel, L.L.P.

[57] ABSTRACT

A multimedia data reproduction apparatus comprising an optical disk library containing a plurality of optical disks and a plurality of optical disk drives, a file management unit for managing names of motion picture files stored in the respective optical disks, a media management unit for managing whether each of the optical disks is being used or not, a drive management unit for managing whether each of the optical disk drives is being used or not, an open processing unit for deciding whether to accept a request to start reading or reject it according to information from the file management unit, media management unit and the drive management unit, a close processing unit for performing close processing of a motion picture file for which a request to end reading is issued, a data readout control unit for reading motion picture data in response to the request to start reading, and a network control unit for controlling communication between the above-mentioned units and terminal PCs 20. In this apparatus, it is possible to continuously reproduce motion pictures from the optical disk library.

27 Claims, 15 Drawing Sheets multimedia data reproduction apparatus 1

Fig.4 (a)

| drive identifier | drive use media |
|---|---|
| 1 | 1 |
| 2 | 2 |
| 3 | 0 |
| 4 | 0 |

Fig.4 (b)

| drive identifier | drive use media |
|---|---|
| 1 | 1 |
| 2 | 2 |
| 3 | 3 |
| 4 | 0 |

Fig.4 (c)

| drive identifier | drive use media |
|---|---|
| 1 | 1 |
| 2 | 2 |
| 3 | 5 |
| 4 | 4 |

Fig.5 (a)

| media identifier | media use count |
|---|---|
| 1 | 3 |
| 2 | 0 |
| 3 | 2 |
| 4 | 0 |
| ⋮ | ⋮ |

Fig.5 (b)

| media identifier | media use count |
|---|---|
| 1 | 3 |
| 2 | 1 |
| 3 | 2 |
| 4 | 0 |
| ⋮ | ⋮ |

Fig.5 (c)

| media identifier | media use count |
|---|---|
| 1 | 3 |
| 2 | 1 |
| 3 | 3 |
| 4 | 0 |
| ⋮ | ⋮ |

Fig.6 (a)

| drive identifier | drive use media |
|---|---|
| 1 | 3 |
| 2 | 0 |
| 3 | 1 |
| 4 | 0 |

Fig.6 (b)

| drive identifier | drive use media |
|---|---|
| 1 | 3 |
| 2 | 2 |
| 3 | 1 |
| 4 | 0 |

Fig.7

| file name | media identifier | | | | |
|---|---|---|---|---|---|
| Video 1 | 1 | 2 | | | |
| Video 2 | 1 | 2 | 3 | | |
| Video 3 | 2 | 3 | | | |
| Video 4 | 4 | | | | |
| Video 5 | 1 | 3 | | | |
| Video 6 | 1 | 4 | | | |
| Video 7 | 5 | | | | |
| ⋮ | ⋮ | ⋮ | ⋮ | ⋮ | ⋮ |

Fig.8 (a)

| media identifier | media reservation count |
|---|---|
| 1 | 2 |
| 2 | 3 |
| 3 | 2 |
| 4 | 0 |
| 5 | 0 |
| ⋮ | ⋮ |

Fig.8 (b)

| media identifier | media reservation count |
|---|---|
| 1 | 2 |
| 2 | 3 |
| 3 | 2 |
| 4 | 1 |
| 5 | 0 |
| ⋮ | ⋮ |

Fig.8 (c)

| media identifier | media reservation count |
|---|---|
| 1 | 3 |
| 2 | 3 |
| 3 | 3 |
| 4 | 1 |
| 5 | 0 |
| ⋮ | ⋮ |

Fig.8 (d)

| media identifier | media reservation count |
|---|---|
| 1 | 3 |
| 2 | 3 |
| 3 | 3 |
| 4 | 1 |
| 5 | 1 |
| ⋮ | ⋮ |

| drive identifier | drive use media |
|---|---|
| 1 | 1 |
| 2 | 2 |
| 3 | 3 |
| 4 | 0 |

| drive identifier | drive use media |
|---|---|
| 1 | 1 |
| 2 | 2 |
| 3 | 3 |
| 4 | 4 |

Fig.11 (a)

| file identifier | offset |
|---|---|
| Video 1 | 100 |
| Video 2 | 400 |
| Video 3 | 200 |
| Video 4 | 1000 |

Fig.11 (b)

| file identifier | offset |
|---|---|
| Video 1 | 100 |
| Video 2 | 400 |
| Video 3 | 200 |
| Video 4 | 1000 |
| Video 5 | 1 |

Fig.11 (c)

| file identifier | offset |
|---|---|
| Video 1 | 100 |
| Video 2 | 400 |
| Video 3 | 200 |
| Video 4 | 1000 |
| Video 5 | 2 |

Fig.11 (d)

| file identifier | offset |
|---|---|
| Video 1 | 100 |
| Video 2 | 400 |
| Video 3 | 200 |
| Video 4 | 1000 |
| Video 5 | 2 |
| Video 1 | 1 |

| open file name | offset | terminal ID |
|---|---|---|
| Video 1 | 100 | 132. 182. 41. 10 |
| Video 2 | 400 | 132. 182. 41. 13 |
| Video 3 | 200 | 132. 182. 41. 20 |
| Video 4 | 1000 | 132. 182. 41. 25 |
| ⋮ | ⋮ | ⋮ |

1801  1802  1803  180

APPARATUS FOR REPRODUCING MULTIMEDIA DATA, METHOD FOR REPRODUCING MULTIMEDIA DATA, AND RECORD MEDIA CONTAINING MULTIMEDIA DATA REPRODUCTION PROGRAM

FIELD OF THE INVENTION

The present invention relates to apparatuses and methods for reproducing multimedia data, and record media containing programs for reproducing multimedia data. More particularly, the invention relates to those capable of continuously reproducing motion pictures from a multimedia library unit.

BACKGROUND OF THE INVENTION

In recent years, a multimedia server system has attracted a lot of attention, in which multimedia data including various kinds of data (e.g., image, voice, character) are stored in a mass storage connected to a computer, and the stored multimedia data are transmitted through a network to terminal units.

FIG. 13 is a block diagram showing an example of a multimedia server system for sending a motion picture stored in a magnetic disk to a personal computer (hereinafter referred to as "PC") connected to a network (refer to "Video server adapted to motion pictures by expanding NFS and TCP/IP", Nikkei Electronics, Sep. 25, 1996, p133–p141).

In FIG. 13, reference numeral 22 designates a server, 23 designates a disk array unit comprising a plurality of magnetic disks, 20 designates PCs, and 21 designates a network transfer unit.

The multimedia server system so constructed operates as follows.

Initially, each PC 20 sends a request to read data of a motion picture through the network transfer unit 21 to the server 22. Receiving the requests to read motion picture data from plural PCs 20, the server 22 reads the motion picture data corresponding to the respective requests from the disk array unit 23 at a uniform rate required for continuous reproduction of motion pictures. Then, the server 22 transmits the read data at a uniform rate through the network transfer unit 21 to the respective PCs. Receiving the motion picture data, each PC 20 displays the motion picture on a screen using software on the PC 20 or hardware.

For example, the reference literature mentioned above discloses a specific system for reproducing arbitrary motion picture data stored in the disk array unit 23, simultaneously on forty PCs 20 at a rate of 1.5 Mbit/sec.

Since the disk array unit 23 is very expensive, in order to reduce the cost of the whole system, a multimedia library unit, such as an optical disk library, may be connected to the disk array unit 23 as an auxiliary storage unit (refer to "Invitation to latest HSM technology 'nessy', No. 2, Virtual Resource and Offline Management", Monthly Sun World, October, 1995).

In this system, data of high access frequency are stored in the high-speed and expensive magnetic disk array unit while data of low access frequency are stored in the low-speed and inexpensive optical disk library. When referring to the data stored in the optical disk library, the data are once copied to the magnetic disk array unit and then output.

In this system, however, since the motion picture data must be once copied from the optical disk library to the magnetic disk, it takes a lot of time from receiving a request to read motion picture data stored in the optical disk library to start reading of the motion picture data. In case of a motion picture server, the possibility that the motion picture data copied from the optical disk library to the magnetic disk are accessed again is not always high.

As a measure to solve the problem mentioned above, instead of the magnetic disk, the optical disk library may be connected to the server. In this case, however, since an optical disk access unit (disk drive) contained in the optical disk library has a data reading rate lower than that of the magnetic disk, the number of motion picture data simultaneously and continuously read from a single optical disk is limited. Hence, when a plurality of accesses are concentrated to motion picture data stored in a single optical disk, reproduction of motion pictures is interrupted.

Furthermore, an optical disk library unit contains less number of optical disk access units than the number of optical disks contained therein. For example, an optical disk library having a capacity of 100 optical disks contains 4 optical disk access units. So, when receiving requests for simultaneous accesses to optical disks exceeding the number of the optical disk access units, these requests are processed by time division while changing the optical disks using a disk changer contained in the library. However, it is impossible to continuously read all of the requested motion picture data at a uniform rate. Accordingly, when plural accesses are concentrated to a single optical disk library unit, reproduction of motion pictures is interrupted as well.

The above-mentioned problem also occurs when a tape library serving as a multimedia library unit is connected to the server, which library contains plural video tapes in which multimedia titles such as movies are recorded and reads arbitrary ones of these video tapes after mounting them on plural tape drives using a tape changer.

SUMMARY OF THE INVENTION

It is an object of the present invention to provide an apparatus for reproducing multimedia data, which apparatus can continuously reproduce motion pictures from a multimedia library unit such as an optical disk library or a tape library.

It is another object of the present invention to provide a method for reproducing multimedia data, which method can continuously reproduce motion pictures from a multimedia library unit such as an optical disk library or a tape library.

It is still another object of the present invention to provide a record medium containing a program for reproducing multimedia data, which program can continuously reproduce motion pictures from a multimedia library unit such as an optical disk library or a tape library.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the invention, there is provided a multimedia data reproduction apparatus including a library unit which contains a plurality of recording media each having at least one multimedia title comprising a series of multimedia data, and at least one reproduction unit that mounts arbitrary one of the recording media and reproduces multimedia data of a multimedia title of the recording medium, the apparatus being connected through a communication mediating means to a plurality of terminal units and, when receiving a request to read multimedia data of a multimedia title from arbitrary one of the terminal units, the apparatus reading multimedia data of the requested multimedia title from a recording medium in the library unit using the reproduction unit and then transmitting the read data to the terminal unit that requests the multimedia title;

the apparatus being characterized by:

a file management unit managing which recording medium contains which multimedia title;

a media management unit managing whether or not each of the recording media is being used for reproduction of multimedia data; and a reproduction unit management unit managing which reproduction unit is being used for reproduction of multimedia data from which recording medium;

wherein, when a request to start reading of multimedia data of the requested multimedia title is issued, a recording medium containing the requested multimedia title is obtained from the file management unit, whether the obtained recording medium is being used for reproduction of multimedia data or not is obtained from the media management unit, and whether a reproduction unit being not used for reproduction of multimedia data is available or not is obtained from the reproduction unit management unit;

when the obtained recording medium is not being used and a reproduction unit being not used is available, reading of the multimedia data of the requested multimedia title is carried out; and when the obtained recording medium is being used or when a reproduction unit being not used is unavailable, the request to start reading is rejected.

According to a second aspect of the present invention, in the above-mentioned multimedia data reproduction apparatus:

the file management unit stores information about which recording medium contains which multimedia title;

the media management unit stores information about whether or not each of the recording media is being used for reproduction of multimedia data; and the reproduction unit management unit stores information about which reproduction unit is being used for reproduction of multimedia data from which recording medium; and the apparatus further including:

an open processing unit which processes the request to start reading of multimedia data of the requested multimedia title in the following manner:

receiving the request to start reading, the open processing unit obtains a recording medium containing the requested multimedia title from the file management unit, obtains whether the obtained recording medium is being used for reproduction of multimedia data or not from the media management unit, and obtains whether a reproduction unit being not used for reproduction of multimedia data is available or not from the reproduction unit management unit;

when the obtained recording medium is being not used and a reproduction unit being not used is available, the open processing unit sets the obtained recording medium to "being used" in the storage of the media management unit and sets the unused reproduction unit to "being used" for the obtained recording medium in the storage of the reproduction unit management unit, and makes the reproduction unit perform reading of multimedia data of the requested multimedia title; and when the obtained recording medium is being used or when a reproduction unit being not used is unavailable, the open processing unit posts that the request to start reading is rejected; and a close processing unit which processes a request to end reading of multimedia data of the multimedia title in the following manner:

receiving the request to end reading, the close processing unit sets the recording medium containing the multimedia title for which the request to end reading is issued to "not used" in the storage of the media management unit, and sets the reproduction unit which has been used for reproduction of the recording medium to "not used" in the storage of the reproduction unit management unit.

According to a third aspect of the present invention, there is provided a multimedia data reproduction apparatus including a library unit which contains a plurality of recording media each having at least one multimedia title comprising a series of multimedia data, and at least one reproduction unit that mounts arbitrary one of the recording media and reproduces multimedia data or M pieces of multimedia titles simultaneously from the recording medium, the apparatus being connected through a communication mediating means to a plurality of terminal units and, when receiving a request to read a multimedia title from arbitrary one of the terminal units, the apparatus reading multimedia data of the requested multimedia title from a recording medium in the library unit using the reproduction unit and transmitting the read data to the terminal unit that requests the multimedia title;

the apparatus being characterized by:

a file management unit storing information about which recording medium contains which multimedia title;

a media management unit storing the number N of multimedia titles being used for reproduction of multimedia data from each recording medium;

a reproduction unit management unit storing information about which reproduction unit is being used for reproduction of multimedia data from which recording medium;

an open processing unit which proccesses a request to start reading of multimedia data of the requested multimedia title in the following manner:

receiving the request to start reading, the open processing unit obtains a recording medium containing the requested multimedia title from the file management unit, obtains the number N of multimedia titles being reproduced from the obtained recording medium from the media management unit, and obtains whether a reproduction unit being not used for reproduction of multimedia data is available or not from the reproduction unit management unit;

when the obtained recording medium is N=0 and a reproduction unit being not used is available, or when the obtained recording medium is $1 \leq N \leq (M-1)$, the open processing unit increments the number N of the multimedia titles being reproduced from the obtained recording medium in the storage of the media management unit and, especially when the obtained recording medium is N=0, the open processing unit sets the unused reproduction unit to "being used" for the obtained recording medium in the storage of the reproduction unit management unit, and makes the reproduction unit perform reading of multimedia data of the requested multimedia title; and when the obtained recording medium is N=0 and a reproduction unit being not used is unavailable or when the obtained recording medium is N≧M, the open processing unit posts that the request to start reading is rejected; and a close processing unit which processes a request to end reading of multimedia data of the multimedia title in the following manner:

receiving the request to end reading, the close processing unit decrements the number N of the multimedia titles being reproduced from the recording medium containing the multimedia title for which the request to end reading is issued in the storage of the media management unit and, when the recording medium becomes N=0 as a result of the decrement, the close processing unit sets the reproduction unit that has been used for reproduction of the recording medium to "not used" in the storage of the reproduction unit management unit.

According to a fourth aspect of the present invention, there is provided a multimedia data reproduction apparatus including a library unit which contains a plurality of recording media each having at least one multimedia title comprising a series of multimedia data, and at least one reproduction unit that mounts arbitrary one of the recording media and reproduces multimedia data of M pieces of multimedia titles simultaneously from the recording medium, the apparatus being connected through a communication mediating means to a plurality of terminal units and, when receiving a request to read a multimedia title from arbitrary one of the terminal units, the apparatus reading multimedia data of the requested multimedia title from a recording medium in the library unit using the reproduction unit and transmitting the read data to the terminal unit that requests the multimedia title;

the apparatus being characterized by:

a file management unit storing information about which recording medium contains which multimedia title;

a media management unit storing the number N of multimedia titles being used for reproduction of multimedia data from each recording medium;

a reproduction unit management unit storing information about which reproduction unit is being used for reproduction of multimedia data from which recording medium;

an open processing unit which processes a request to start reading of multimedia data of the requested multimedia title in the following manner:

receiving the request to start reading, the open processing unit obtains all recording media containing the requested multimedia title from the file management unit, obtains the number N of multimedia titles being reproduced from each of the obtained recording media from the media management unit, and obtains the number of reproduction units being not used for reproduction of multimedia data from the reproduction unit management unit;

when all of the obtained recording media are N≦(M−1) and there are reproduction units being not used as many as or more than the number of the obtained recording media being N=0, the open processing unit increments the number N of the multimedia titles being reproduced from each of the obtained recording media in the storage of the media management unit, sets each of the unused reproduction units to "being used" for each of the recording media being N=0 in the storage of the reproduction unit management unit, and makes the reproduction units perform reading of multimedia data of the requested multimedia title; and when there is at least one recording medium being N≧2M or when there are no reproduction units being not used as many as the number of the recording media being N=0, the open processing unit posts that the request to start reading is rejected; and a close processing unit which processes a request to end reading of multimedia data of the multimedia title in the following manner:

receiving the request to end reading, the close processing unit decrements the number N of the multimedia titles being reproduced from each of the recording media containing the multimedia title for which the request to end reading is issued in the storage of the media management unit and, when there are recording media being N=0 after the decrement, the close processing unit sets the reproduction units which have been used for reproduction of the recording media to "not used" in the storage of the reproduction unit management unit.

According to a fifth aspect of the present invention, the multimedia data reproduction apparatus according to any of the second, third, and fourth aspects further includes:

an open detector which monitors requests to read multimedia data of multimedia titles from the respective terminal units and, when there is a first request to read multimedia data of a multimedia title, issues a request to start reading of multimedia data of the multimedia title toward the open processing unit.

According to a sixth aspect of the present invention, the multimedia data reproduction apparatus according to any of the second, third and fourth aspects further includes:

a close detector which monitors requests to read multimedia data of multimedia titles from the respective terminal units and, when a request to read multimedia data of a multimedia title is stopped for a prescribed period of time, issues a request to end reading of multimedia data of the multimedia title toward the close processing unit.

According to a seventh aspect of the present invention, the multimedia data reproduction apparatus according to the fifth aspect further includes:

a close detector which monitors requests to read multimedia data of multimedia titles from the respective terminal units and, when a request to read multimedia data of a multimedia title is stopped for a prescribed period of time, issues a request to end reading of multimedia data of the multimedia title toward the close processing unit.

According to an eighth aspect of the present invention, in the multimedia data reproduction apparatus according to the seventh aspect, when the open processing unit posts that the request to start reading is rejected, the close detector shortens the period of time and, thereafter, the open detector reissues the rejected request to start reading.

According to a ninth aspect of the present invention, the multimedia data reproduction apparatus according to any of the second, third and fourth aspects further includes:

a close detector which monitors requests to read multimedia data of multimedia titles from the respective terminal units and performs as follows:
  when a request to read multimedia data of a multimedia title is stopped for a prescribed period of time, the close detector issues a request to end reading of multimedia data of the multimedia title toward the close processing unit; and
  when a request to read multimedia data of a multimedia title from a terminal unit is changed to a request to read multimedia data of another multimedia title from the same terminal unit, the close detector issues a request to end reading of multimedia data of the multimedia title before the change toward the close processing unit.

According to a tenth aspect of the present invention, the multimedia data reproduction apparatus according to the fifth aspect further includes:
  a close detector which monitors requests to read multimedia data of multimedia titles from the respective terminal units and performs as follows:
    when a request to read multimedia data of a multimedia title is stopped for a prescribed period of time, the close detector issues a request to end reading of multimedia data of the multimedia title toward the close processing unit; and
    when a request to read multimedia data of a multimedia title from a terminal unit is changed to a request to read multimedia data of another multimedia title from the same terminal unit, the close detector issues a request to end reading of multimedia data of the multimedia title before the change toward the close processing unit.

According to an eleventh aspect of the present invention, there is provided a multimedia data reproduction method using a library unit which contains a plurality of recording media each having at least one multimedia title comprising a series of multimedia data, and at least one reproduction unit that mounts arbitrary one of the recording media and reproduces multimedia data of a multimedia title of the recording medium, wherein, when there is a request to read multimedia data of a multimedia title from arbitrary one of plural terminal units connected through a communication mediating means, multimedia data of the requested multimedia title are read from a recording medium in the library unit using the reproduction unit and then the read data are transmitted to the terminal unit that requests the multimedia title;
  the method using:
    a file management table managing which recording medium contains which multimedia title;
    a media management table managing whether or not each of the recording media is being used for reproduction of multimedia data; and
    a reproduction unit management table managing which reproduction unit is being used for reproduction of multimedia data from which recording medium;
  wherein, when a request to start reading of multimedia data of the requested multimedia title is issued, a recording medium containing the requested multimedia title is obtained from the file management table, whether the obtained recording medium is being used for reproduction of multimedia data or not is obtained from the media management table, and whether a reproduction unit being not used for reproduction of multimedia data is available or not is obtained from the reproduction unit management table;
    when the obtained recording medium is not being used and a reproduction unit being not used is available, reading of the multimedia data of the requested multimedia title is carried out; and
    when the obtained recording medium is being used or when a reproduction unit being not used is unavailable, the request to start reading is rejected.

According to a twelfth aspect of the present invention, the multimedia data reproduction method according to the eleventh aspect includes:
  an open processing in which a request to start reading of multimedia data of the requested multimedia title is processed in the following manner:
    when receiving the request to start reading, a recording medium containing the requested multimedia title is obtained from the file management table, whether the obtained recording medium is being used for reproduction of multimedia data or not is obtained from the media management table, and whether a reproduction unit being not used for reproduction of multimedia data is available or not is obtained from the reproduction unit management table;
    when the obtained recording medium is being not used and a reproduction unit being not used is available, the obtained recording medium is set to "being used" in the management of the media management table, the unused reproduction unit is set to "being used" for the obtained recording medium in the management of the reproduction unit management table, and reading of multimedia data of the requested multimedia title is carried out; and
    when the obtained recording medium is being used or when a reproduction unit being not used is unavailable, a notification that the request to start reading is rejected is posted; and
  a close processing in which a request to end reading of multimedia data of the multimedia title is processed in the following manner:
    when receiving the request to end reading, the recording medium containing the multimedia title, for which the request to end reading is issued, is set to "not used" in the management of the media management table, and the reproduction unit which has been used for reproduction of the recording medium is set to "not used" in the management of the reproduction unit management table.

According to a thirteenth aspect of the present invention, there is provided a multimedia data reproduction method using a library unit which contains a plurality of recording media each having at least one multimedia title comprising a series of multimedia data, and at least one reproduction unit that mounts arbitrary one of the recording media and reproduces multimedia data of M pieces of multimedia titles simultaneously from the recording medium, wherein, when there is a request to read multimedia data of a multimedia title from arbitrary one of plural terminal units connected through a communication mediating means, multimedia data of the requested multimedia title arc read from a recording medium in the library unit using the reproduction unit and then the read data are transmitted to the terminal unit that requests the multimedia title;
  the method using:
    a file management table managing which recording medium contains which multimedia title;
    a media management table managing the number N of multimedia titles being used for reproduction of multimedia data from each recording medium; and a reproduction unit management table managing which reproduction unit is being used for reproduction of multimedia data from which recording medium;

the method including:

an open processing in which a request to start reading of multimedia data of the requested multimedia title is processed in the following manner:

when receiving the request to start reading, a recording medium containing the requested multimedia title is obtained from the file management table, the number N of multimedia titles being reproduced from the obtained recording medium is obtained from the media management table, and whether a reproduction unit being not used for reproduction of multimedia data is available or not is obtained from the reproduction unit management table;

when the obtained recording medium is N=0 and a reproduction unit being not used is available, or when the obtained recording medium is $1 \leq N \leq (M-1)$, the number N of the multimedia titles being reproduced from the obtained recording medium is incremented in the management of the media management table and, especially when the obtained recording medium is N=0, the unused reproduction unit is set to "being used" for the obtained recording medium in the management of the reproduction unit management table, and reading of multimedia data of the requested multimedia title is carried out; and when the obtained recording medium is N=0 and a reproduction unit being not used is unavailable or when the obtained recording medium is $N \geq M$, a notification that the request to start reading is rejected is issued; and a close processing in which a request to end reading of multimedia data of the multimedia title is processed in the following manner:

when receiving the request to end reading, the number N of the multimedia titles being reproduced from the recording medium containing the multimedia title, for which the request to end reading is issued, is decremented in the management of the media management table and, when the recording medium becomes N=0 as a result of the decrement, the reproduction unit that has been used for reproduction of the recording medium is set to "not used" in the management of the reproduction unit management table.

According to a fourteenth aspect of the present invention, there is provided a multimedia data reproduction method using a library unit which contains a plurality of recording media each having at least one multimedia title comprising a series of multimedia data, and at least one reproduction unit that mounts arbitrary one of the recording media and reproduces multimedia data of M pieces of multimedia titles simultaneously from the recording medium, wherein, when there is a request to read multimedia data of a multimedia title from arbitrary one of plural terminal units connected through a communication mediating means, multimedia data of the requested multimedia title are read from a recording medium in the library unit using the reproduction unit and then the read data are transmitted to the terminal unit that requests the multimedia title;

the method using;

a file management table managing which recording medium contains which multimedia title;

a media management table managing the number N of multimedia titles being used for reproduction of multimedia data from each recording medium; and a reproduction unit management table managing which reproduction unit is being used for reproduction of multimedia data from which recording medium;

the method including:

an open processing in which a request to start reading of multimedia data of the requested multimedia title is processed in the following manner:

when receiving the request to start reading, all recording media containing the requested multimedia title are obtained from the file management table, the number N of multimedia titles being reproduced from each of the obtained recording media is obtained from the media management table, and the number of reproduction units being not used for reproduction of multimedia data is obtained from the reproduction unit management table;

when all of the obtained recording media are $N \leq (M-1)$ and there are reproduction units being not used as many as or more than the number of the obtained recording media being N=0, the number N of the multimedia titles being reproduced from each of the obtained recording media is incremented in the management of the media management table, each of the unused reproduction units is set to "being used" for each of the recording media being N=0 in the management of the reproduction unit management table, and reading of multimedia data of the requested multimedia title is carried out; and when there is at least one recording medium being $N \geq M$ or when there are no reproduction units being not used as many as the number of the recording media being N=0, a notification that the request to start reading is rejected is issued; and a close processing in which a request to end reading of multimedia data of the multimedia title is processed in the following manner:

when receiving the request to end reading, the number N of the multimedia titles being reproduced from each of the recording media containing the multimedia title, for which the request to end reading is issued, is decremented in the management of the media management table and, when there are recording media being N=0 after the decrement, the reproduction units which have been used for reproduction of the recording media are set to "not used" in the management of the reproduction unit management table.

According to a fifteenth aspect of the present invention, there is provided a computer readable recording medium containing a program for reproducing multimedia data by a computer:

the program providing a multimedia data reproduction procedure using a library unit which contains a plurality of recording media each having at least one multimedia title comprising a series of multimedia data, and at least one reproduction unit that mounts arbitrary one of the recording media and reproduces multimedia data of a multimedia title of the recording medium, wherein, when there is a request to read multimedia data of a multimedia title from arbitrary one of plural terminal units connected through a communication mediating means, multimedia data of the requested multimedia title are read from a recording medium in the library unit using the reproduction unit and then the read data are transmitted to the terminal unit that requests the multimedia title;

the procedure using:

a file management table managing which recording medium contains which multimedia title;

a media management table managing whether or not each of the recording media is being used for reproduction of multimedia data; and a reproduction unit management table managing which reproduction unit is being used for reproduction of multimedia data from which recording medium;

wherein, when a request to start reading of multimedia data of the requested multimedia title is issued, a recording medium containing the requested multimedia title is obtained from the file management table, whether the obtained recording medium is being used for reproduction of multimedia data or not is obtained from the media management table, and whether a reproduction unit being not used for reproduction of multimedia data is available or not is obtained from the reproduction unit management table;

when the obtained recording medium is not being used and a reproduction unit being not used is available, reading of the multimedia data of the requested multimedia title is carried out; and when the obtained recording medium is being used or when a reproduction unit being not used is unavailable, the request to start reading is rejected.

According to a sixteenth aspect of the present invention, in the recording medium according to the fifteenth aspect, the multimedia data reproduction procedure includes:

an open processing in which a request to start reading of multimedia data of the requested multimedia title is processed in the following manner:

when receiving the request to start reading, a recording medium containing the requested multimedia title is obtained from the file management table, whether the obtained recording medium is being used for reproduction of multimedia data or not is obtained from the media management table, and whether a reproduction unit being not used for reproduction of multimedia data is available or not is obtained from the reproduction unit management table;

when the obtained recording medium is being not used and a reproduction unit being not used is available, the obtained recording medium is set to "being used" in the management of the media management table, the unused reproduction unit is set to "being used" for the obtained recording medium in the management of the reproduction unit management table, and reading of multimedia data of the requested multimedia title is carried out; and when the obtained recording medium is being used or when a reproduction unit being not used is unavailable, a notification that the request to start reading is rejected is posted; and a close processing in which a request to end reading of multimedia data of the multimedia title is processed in the following manner:

when receiving the request to end reading, the recording medium containing the multimedia title, for which the request to end reading is issued, is set to "not used" in the management of the media management table, and the reproduction unit which has been used for reproduction of the recording medium is set to "not used" in the management of the reproduction unit management table.

According to a seventeenth aspect of the present invention, there is provided a computer readable recording medium containing a program for reproducing multimedia data by a computer:

the program providing a multimedia data reproduction procedure using a library unit which contains a plurality of recording media each having at least one multimedia title comprising a series of multimedia data, and at least one reproduction unit that mounts arbitrary one of the recording media and reproduces multimedia data of M pieces of multimedia titles simultaneously from the recording medium, wherein, when there is a request to read multimedia data of a multimedia title from arbitrary one of plural terminal units connected through a communication mediating means, multimedia data of the requested multimedia title are read from a recording medium in the library unit using the reproduction unit and then the read data are transmitted to the terminal unit that requests the multimedia title;

the procedure using:

a file management table managing which recording medium contains which multimedia title;

a media management table managing the number N of multimedia titles being used for reproduction of multimedia data from each recording medium; and a reproduction unit management table managing which reproduction unit is being used for reproduction of multimedia data from which recording medium;

the procedure including:

an open processing in which a request to start reading of multimedia data of the requested multimedia title is processed in the following manner:

when receiving the request to start reading, a recording medium containing the requested multimedia title is obtained from the file management table, the number N of multimedia titles being reproduced from the obtained recording medium is obtained from the media management table, and whether a reproduction unit being not used for reproduction of multimedia data is available or not is obtained from the reproduction unit management table;

when the obtained recording medium is $N=0$ and a reproduction unit being not used is available, or when the obtained recording medium is $1 \leq N \leq (M-1)$, the number N of the multimedia titles being reproduced from the obtained recording medium is incremented in the management of the media management table and, especially when the obtained recording medium is $N=0$, the unused reproduction unit is set to "being used" for the obtained recording medium in the management of the reproduction unit management table, and reading of multimedia data of the requested multimedia title is carried out; and when the obtained recording medium is $N=0$ and a reproduction unit being not used is unavailable or when the obtained recording medium is $N \geq M$, a notification that the request to start reading is rejected is issued; and a close processing in which a request to end reading of multimedia data of the multimedia title is processed in the following manner:

when receiving the request to end reading, the number N of the multimedia titles being reproduced from the recording medium containing the multimedia title, for which the request to end reading is issued, is decremented in the management of the media management table and, when the recording medium becomes N=0 as a result of the decrement, the reproduction unit that has been used for reproduction of the recording medium is set to "not used" in the management of the reproduction unit management table.

According to an eighteenth aspect of the present invention, there is provided a computer readable recording medium containing a program for reproducing multimedia data by a computer:

the program providing a multimedia data reproduction procedure using a library unit which contains a plurality of recording media each having at least one multimedia title comprising a series of multimedia data, and at least one reproduction unit that mounts arbitrary one of the recording media and reproduces multimedia data of M pieces of multimedia titles simultaneously from the recording medium, wherein, when there is a request to read multimedia data of a multimedia title from arbitrary one of plural terminal units connected through a communication mediating means, multimedia data of the requested multimedia title are read from a recording medium in the library unit using the reproduction unit and then the read data are transmitted to the terminal unit that requests the multimedia title;

the procedure using:
a file management table managing which recording medium contains which multimedia title;
a media management table managing the number N of multimedia titles being used for reproduction of multimedia data from each recording medium; and
a reproduction unit management table managing which reproduction unit is being used for reproduction of multimedia data from which recording medium;

the procedure including:
an open processing in which a request to start reading of multimedia data of the requested multimedia title is processed in the following manner:
when receiving the request to start reading, all recording media containing the requested multimedia title are obtained from the file management table, the number N of multimedia titles being reproduced from each of the obtained recording media is obtained from the media management table, and the number of reproduction units being not used for reproduction of multimedia data is obtained from the reproduction unit management table;
when all of the obtained recording media are $N \leq (M-1)$ and there are reproduction units being not used as many as or more than the number of the obtained recording media being N=0, the number N of the multimedia titles being reproduced from each of the obtained recording media is incremented in the management of the media management table, each of the unused reproduction units is set to "being used" for each of the recording media being N=0 in the management of the reproduction unit management table, and reading of multimedia data of the requested multimedia title is carried out; and
when there is at least one recording medium being $N \geq M$ or when there are no reproduction units being not used as many as the number of the recording media being N=0, a notification that the request to start reading is rejected is issued; and
a close processing in which a request to end reading of multimedia data of the multimedia title is processed in the following manner:
when receiving the request to end reading, the number N of the multimedia titles being reproduced from each of the recording media containing the multimedia title, for which the request to end reading is issued, is decremented in the management of the media management table and, when there are recording media being N=0 after the decrement, the reproduction units which have been used for reproduction of the recording media are set to "not used" in the management of the reproduction unit management table.

BRIEF DESCRIPTION OF THE DRAWINGS

FIGS. 4(a)–4(c) are schematic diagrams illustrating a drive management table at different points of time, which is managed by a drive management unit of the multimedia data reproduction apparatus shown in FIG. 1.

FIGS. 5(a)–5(c) are schematic diagrams illustrating a media management table at different points of time according to a second embodiment of the invention.

FIGS. 6(a) and 6(b) are schematic diagrams illustrating a drive management table at different points of time according to the second embodiment of the invention.

FIG. 7 is a schematic diagram illustrating a file management table according to a third embodiment of the invention.

FIGS. 8(a)–8(d) are schematic diagrams illustrating a media management table at different points of time according to the third embodiment of the invention.

FIGS. 9(a) and 9(b) are schematic diagrams illustrating a drive management table at different points of time according to the third embodiment of the invention.

FIGS. 11(a)–11(d) are schematic diagrams illustrating an open file management table of the network control unit shown in FIG. 10 at different points of time.

DETAILED DESCRIPTION OF THE PREFERRED EMBODIMENTS

[Embodiment 1]

A first embodiment of the invention relates to a system for transmitting multimedia data stored in an optical disk library through a network to terminal PCs.

Figure 1:
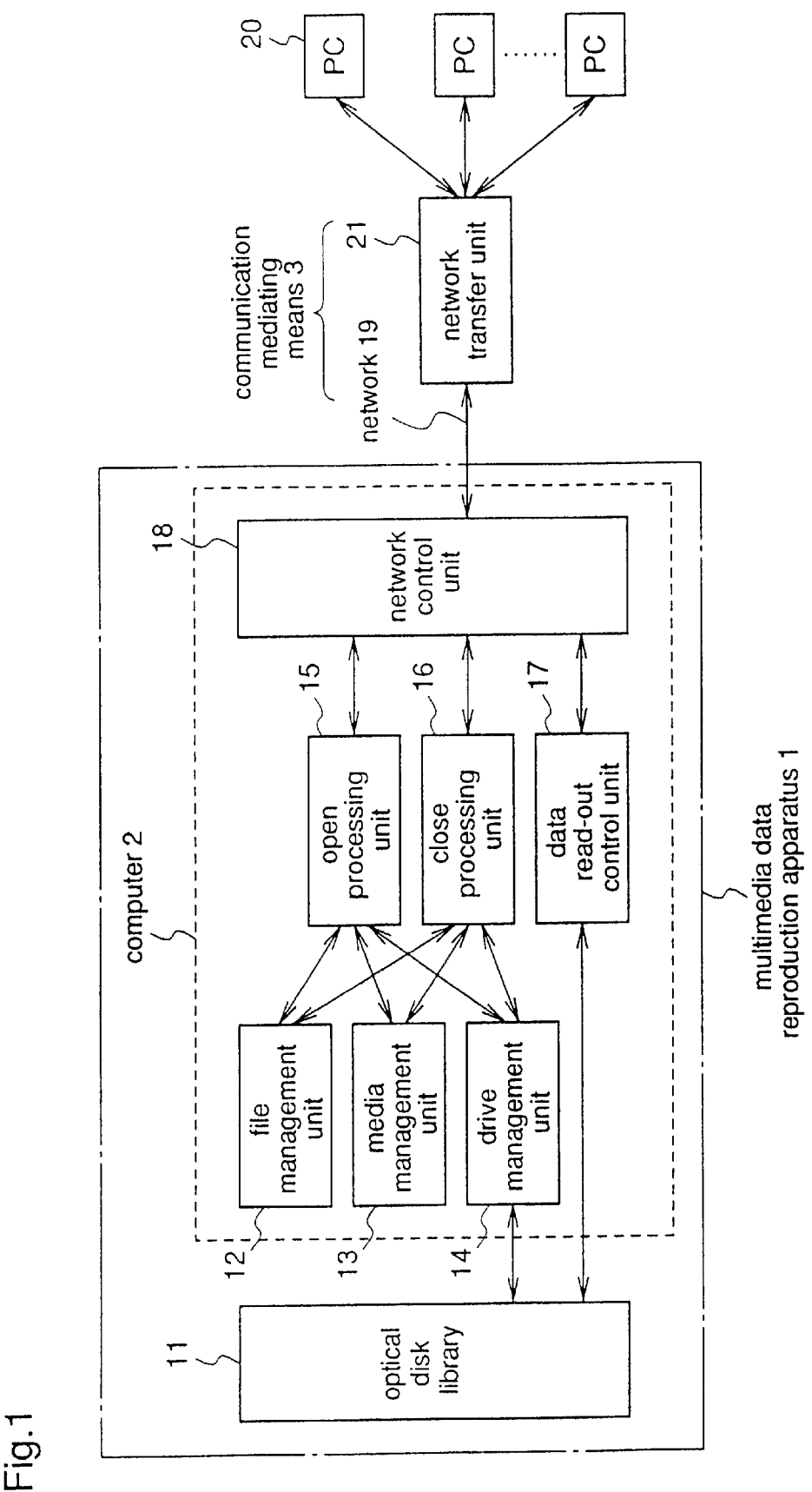
FIG. 1 is a block diagram illustrating a multimedia data reproduction apparatus according to a first embodiment of the invention.

FIG. 1 is a block diagram illustrating a multimedia data reproduction apparatus according to the first embodiment of the invention. In FIG. 1, reference numeral 1 designates a multimedia data reproduction apparatus, 20 designates terminal units (PCs), 19 designates a network, and 21 designates a network transfer unit installed in the network 19. The multimedia data reproduction apparatus 1 is connected to plural terminal PCs 20 through a communication mediating means 3 consisting of the network 19 and the network transfer unit 21.

The multimedia data reproduction apparatus 1 includes an optical disk library 11. The optical disk library 11 comprises shelves having a capacity of 100 optical disks, four optical disk drives (reproduction units), and a disk changer for mounting/dismounting optical disks stored in the shelves on/from the disk drives according to a command of a drive management unit which is described later. These constituents of the optical disk library 11 are not shown in FIG. 1. The apparatus 1 further includes a file management unit 12, a media management unit 13, a drive management unit (reproduction unit management unit) 14, an open processing unit 15, a close processing unit 16, a data readout control unit 17, and a network control unit 18. The file management unit 12 stores information about which optical disk in the optical disk library contains which motion picture file (multimedia title). The media management unit 13 stores information about whether each optical disk is being used for reading motion picture data. The drive management unit 14 stores information about which disk drive in the optical disk library 11 is being used for reading motion picture data from which optical disk. The open processing unit 15 receives information about whether an optical disk containing a motion picture file for which a request to start reading is issued is being used or not and whether there is any disk drive being not used, from the file management unit 12, the media management unit 13, and the drive management unit 14, and decides whether to accept the request to start reading or reject it. The close processing unit 16 receives a request to end reading of a motion picture and releases the optical disk and disk drive which are used for reading of the motion picture file. The data readout control unit 17 reads data of a motion picture file for which a request to read is issued, using the disk drive and the disk changer in the optical disk library 11. The network control unit 18 receives a request to start/end reading of a motion picture file from the terminal PC 20 and transmits the request to the open processing unit 15, the data readout control unit 17, and the close processing unit 16. Further, the network control unit 18 transmits motion picture data, notices, and the like output from these units 15~17 to the terminal PCs 20 or to other units 15~17.

The file management unit 12, the media management unit 13, the open processing unit 15, and the close processing unit 16 are implemented by a CPU (central processing unit) and a main memory of a computer 2. The drive management unit 14 and the data readout control unit 17 are implemented by the CPU and the main memory of the computer 2 and hardware for communicating with the optical disk library 11. The network control unit 18 is implemented by the CPU and the main memory of the computer 2 and hardware for communicating with the terminal PCs 20.

Figure 2:
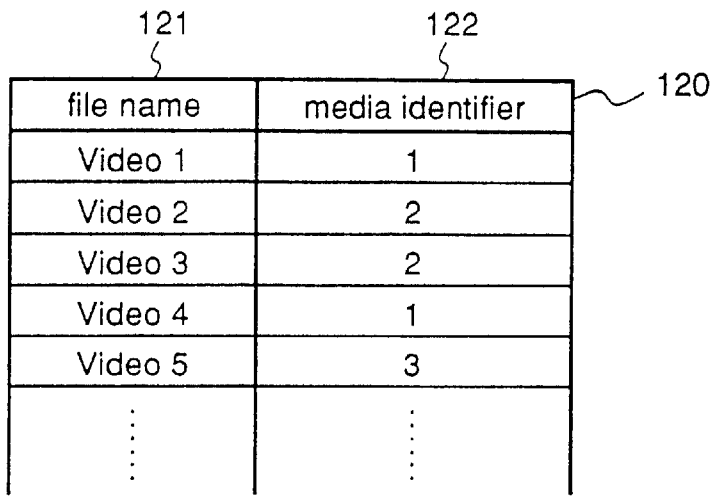
FIG. 2 is a schematic diagram illustrating a file management table managed by a file management unit of the multimedia data reproduction apparatus shown in FIG. 1.

FIG. 2 is a schematic diagram showing a file management table 120 imaged on a memory, which table is managed by the file management unit 12. With reference to FIG. 2, the file management table 120 consists of a file name field 121 showing file names of all motion picture files stored in the optical disk library 11, and a media identifier field 222 showing media identifiers for identifying optical disks in which the respective motion picture files are stored. According to the file management table 120, the file management unit 12 manages which optical disk in the optical disk library 11 contains which motion picture file. Further, the file management table 120 is formed simultaneously with storing of motion picture files in the optical disk library 11.

Figure 3:
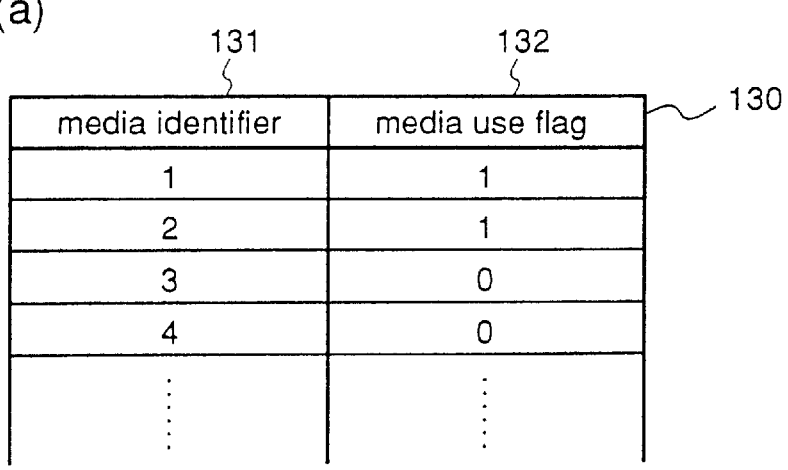
FIGS. 3(a) and 3(b) are schematic diagrams illustrating a media management table at different points of time, which is managed by a media management unit of the multimedia data reproduction apparatus shown in FIG. 1.
Figure 3:
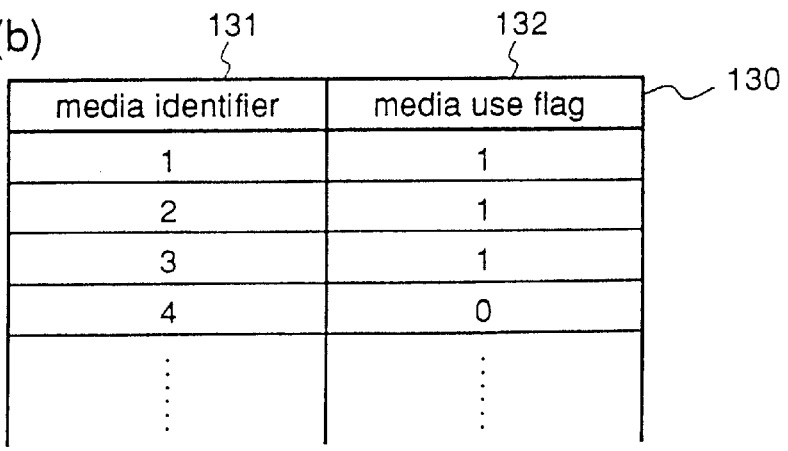

FIGS. 3(a) and 3(b) are schematic diagrams showing a media management table 130 imaged on a memory, which table is managed by the media management unit 13. FIG. 3(a) shows which optical disks are being used at a certain point of time. The state of FIG. 3(a) changes, with time, to the state of FIG. 3(b) wherein an optical disk of media identifier "3" goes into "being used", which disk has not been used in the state of FIG. 3(a). In these figures, the media management table 130 consists of a media identifier field 131 showing media identifiers of all optical disks in the optical disk library 11, and a media use flag field 132 showing media use flags that show whether or not the respective optical disks are being used for reading of motion picture files. The media management unit 13 manages whether or not the respective optical disks are being used for reading of motion picture files according to the media management table 130.

FIGS. 4(a)–4(c) are schematic diagrams showing a drive management table 140 imaged on a memory, which table is managed by the drive management unit 14. In FIG. 4(a), disk drives of drive identifiers "1" and "2" are being used. The state of FIG. 4(a) changes, with time, to the state of FIG. 4(b) where a disk drive of drive identifier "3" goes into "being used", and the state of FIG. 4(b) changes to the state of FIG. 4(c) where all of the disk drives are being used. In these figures, the drive management table 140 consists of a drive identifier field 141 showing drive identifiers of all the optical disk drives in the optical disk library 11, and a drive use media field 142 showing media identifiers of optical disks from which motion picture files are being read by the respective optical disk drives. The drive management unit 14 manages which optical disk uses which disk drive according to the drive management table 140.

Figure 14:
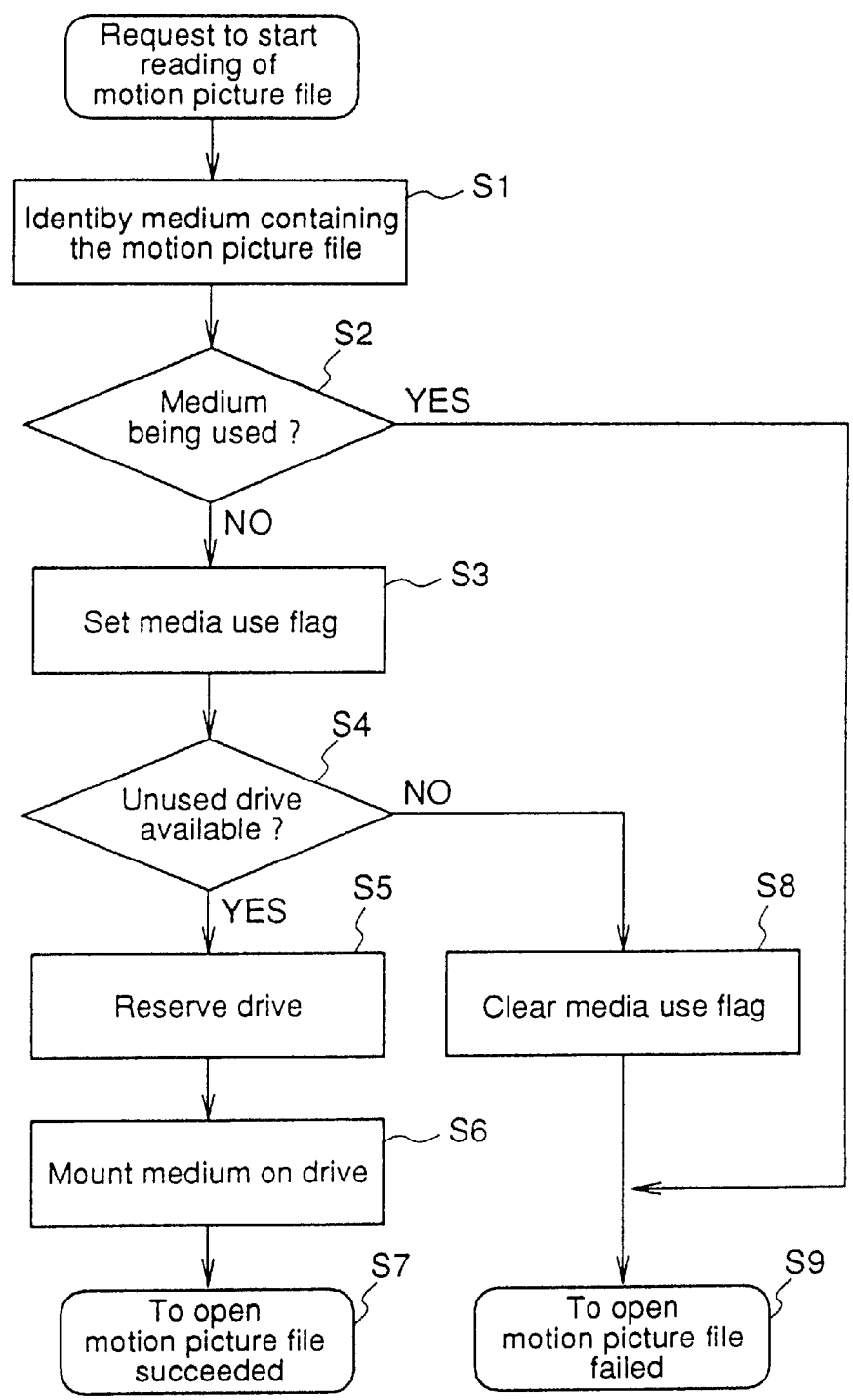
FIG. 14 is a flowchart for explaining open processing of the multimedia data reproduction apparatus according to the first embodiment of the invention.
Figure 15:
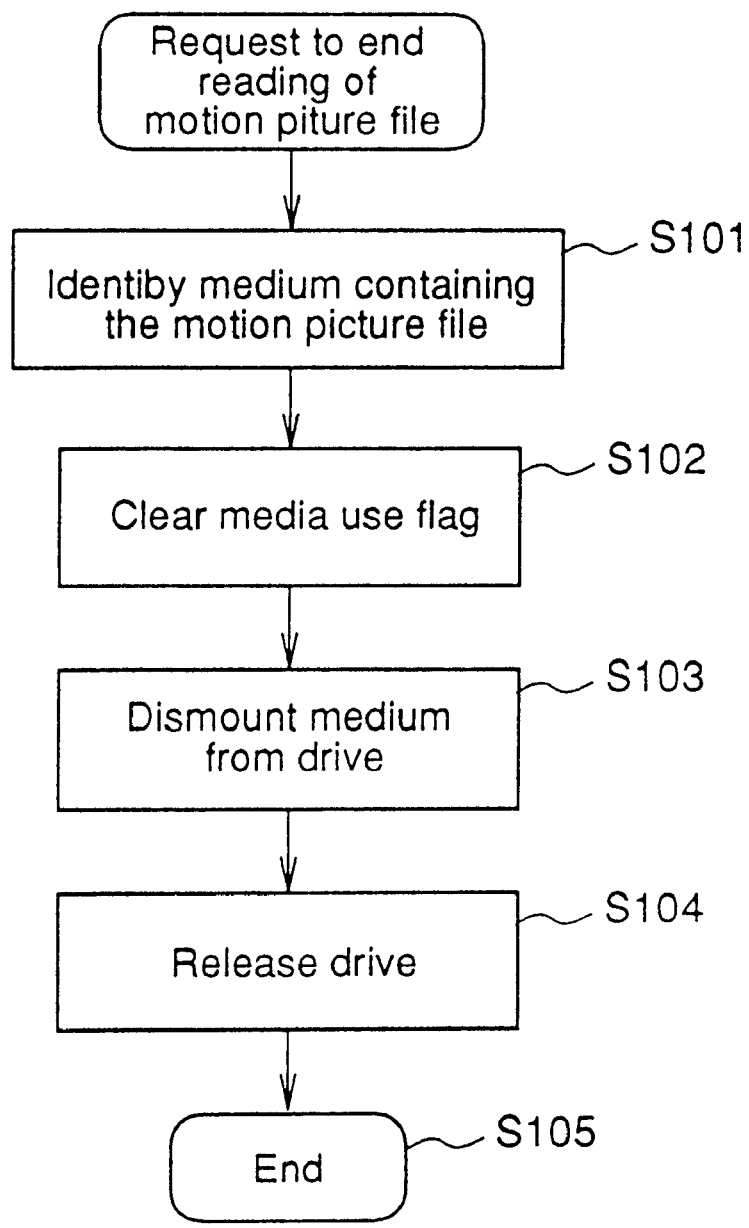
FIG. 15 is a flowchart for explaining close processing of the multimedia data reproduction apparatus according to the first embodiment of the invention.

Next, the operation of the multimedia data reproduction apparatus so constructed will be described using FIGS. 1, 2, 3(a), 3(b), 4(a)–4(c), 14 and 15. FIGS. 14 and 15 are flowcharts showing open processing and close processing of the multimedia data reproduction apparatus according to the first embodiment, respectively.

Initially, a description is given of the case where the terminal PC 20 tries to reproduce a motion picture file "Video1" stored in an optical disk which is currently being used for reproduction of another motion picture.

As shown in FIG. 2, in the optical disk library 11, motion picture files "Video1" and "Video4" are stored in the optical disk of media identifier "1", motion picture files "Video2"

and "Video3" are stored in the optical disk of media identifier "2", and a motion picture file "Video5" is stored in the optical disk of media identifier "3". It is assumed that the optical disks of media identifiers "1" and "2" are currently being used for reproduction of motion picture files as shown in FIG. 3(a), and these optical disks of media identifiers "1" and "2" use the disk drives of drive identifiers "1" and "2", respectively, as shown in FIG. 4(a).

In order to reproduce the motion picture file "Video1", the terminal PC 20 sends a request to start reading of the motion picture file "Video1", through the network transfer unit 21 and the network 19 to the network control unit 18 of the multimedia data reproduction apparatus 1.

Receiving the request to start reading, the network control unit 18 outputs a request to open the motion picture file "Video1" to the open processing unit 15.

Receiving the open request, the open processing unit 15 inquires the media identifier containing the motion picture file "Video1" to the file management unit 12.

Receiving the inquiry, the file management unit 12 examines the file management table 120, discovers that the motion picture file "Video1" is stored in the optical disk of media identifier "1" (step S1), and outputs "1" to the open processing unit 15.

Receiving this output, the open processing unit 15 inquires whether the optical disk of media identifier "1" is currently being used or not to the media management unit 13.

Receiving the inquiry, the media management unit 13 examines the media management table 130, decides that the optical disk of media identifier "1" is currently being used (step S2), and outputs a media unavailable flag to the open processing unit 15.

Receiving the media unavailable flag, the open processing unit 15 outputs a file open error flag to the network control unit 18.

Receiving the file open error flag, the network control unit 18 posts that the motion picture file requested cannot be reproduced, through the network 19 and the network transfer unit 21 to the terminal PC 20 (step S9).

As described above, when the terminal PC 20 outputs a request to start reading of a motion picture file stored in an optical disk which is currently being used for reproduction of another motion picture, since this request is rejected, interruption of the motion picture currently being reproduced is avoided.

Next, a description is given of the case where the terminal PC 20 tries to reproduce a motion picture file "Video5" stored in an optical disk which is not currently being used for reproduction of another motion picture.

In this case, the terminal PC 20 sends a request to start reading of the motion picture file "Video5", through the network transfer unit 21 and the network 19 to the network control unit 18.

Receiving this request, the network control unit 18 outputs a request to open the motion picture file "Video5" to the open processing unit 15.

Receiving the open request, the open processing unit 15 inquires the media identifier containing the motion picture file "Video5" to the file management unit 12. The file management unit 12 examines the file management table 120, discovers that the motion picture file "Video5" is stored in file optical disk of media identifier "3" (step S1), and outputs "3" to the open processing unit 15.

Receiving this output, the open processing unit 15 inquires whether the optical disk of media identifier "3" is currently being used or not to the media management unit 13. The media management unit 13 examines the media management table 130, and decides that the optical disk of media identifier "3" is not currently being used (step S2). Then, the media management unit 13 sets the media use flag corresponding to the media identifier "3" in the media use flag field 131 to "1", i.e., "being used" (step S3), and outputs a media available flag to the open processing unit 15. At this point of time, the content of the media management table 130 is as shown in FIG. 3(b).

Receiving the media available flag, the open processing unit 15 outputs a request to reserve a disk drive for reading the optical disk of media identifier "3" to the drive management unit 14.

Receiving this request, the drive management unit 14 examines the drive management table 140, discovers that the disk drives of drive identifiers "3" and "4" are not being used (step S4), and decides to reserve the disk drive of drive identifier "3" for the optical disk of media identifier "3". Then, the drive management unit 14 writes "3" as a drive use media corresponding to the drive identifier "3" in the drive use media field 142 (step S5), and commands the disk changer to mount the optical disk of media identifier "3" onto the disk drive of drive identifier "3" (step S6). Thereafter, the drive management unit 14 outputs a drive reservation complete flag to the open processing unit 15. At this point of time, the content of the drive management table 140 is as shown in FIG. 4(b).

Receiving the drive reservation complete flag, the open processing unit 15 outputs a file open complete flag to the network control unit 18. Thereafter, the network control unit 18 reads data of the motion picture file "Video5" recorded on the optical disk of media identifier "3" in the optical disk library 11 through the data readout controller 17 using the disk drive of drive identifier "3", and transmits the data through the network 19 and the network transfer unit 21 to the terminal PC 20 (step S7).

As described above, when there is an unused disk drive, a new request to start reading of motion picture data stored in an optical disk which is not used for reproduction of another motion picture is accepted.

Next, a description is given of the case where the terminal PC 20 ends reading of the motion picture file "Video5" started as mentioned above.

Initially, the PC 20 sends a request to end reading of the motion picture file "Video5" through the network transfer unit 21 and the network 19 to the network control unit 18.

Receiving the request, the network control unit 18 issues a request to close the motion picture file "Video5" to the close processing unit 16.

Receiving the close request, the close processing unit 16 inquires the media identifier containing the motion picture file "Video5" to the file management unit 12. The file management unit 12 examines the file management table 120, discovers that the motion picture file "Video5" is stored in the disk of media identifier "3" (step S101), and outputs "3" to the close processing unit 16.

Receiving the output, the close processing unit 16 outputs a request to release the optical disk of media identifier "3" to the media management unit 13.

Receiving the request, the media management unit 13 sets the media use flag corresponding to the media identifier "3" in the media use flag field 132 to "0" (step S102), whereby the optical disk of media identifier "3" is set to the unsed state. At this point of time, the content of the media management table 130 returns to FIG. 3(a).

Further, the close processing unit 16 outputs a request to release the disk drive which is being used for reading the optical disk of media identifier "3", to the drive management unit 14.

Receiving the request, the drive management unit 14 commands the disk changer to dismount the optical disk of media identifier "3" from the disk drive of drive identifier "3" and return the optical disk to where it was stored in the optical disk library 11 (step S103). Thereafter, the drive management unit 14 sets the drive use media corresponding to the drive identifier "3" in the drive use media field 142 to "0" (step S104), whereby the disk drive of drive identifier "3" goes into the unsed state. At this time, the content of the drive management table 140 returns to FIG. 4(*a*).

As described above, when reading of motion picture data is ended, the optical disk and disk drive used for the reading are released so as to be used for a new request to start reading (step S105).

Next, a description is given of the case where the terminal PC 20 issues a request to read a motion picture file "Video5" stored in an optical disk which is not being used for reading another motion picture when all of the disk drives are being used for reading motion pictures.

It is assumed that the drive management table 140 possessed by the drive management unit 14 is in the state of FIG. 4(*c*).

In this case, the process steps from the terminal PC's sending a request to start reading of "Video5" toward the open processing unit's outputting a request to reserve a disk drive for reading the optical disk of media identifier "3" toward the drive management unit 14 are identical to those described above.

Receiving the request to reserve a disk drive from the open processing unit 15, the drive management unit 14 examines the drive management table 140, decides that all of the disk drives are being used because there is no media identifier "0" in the drive use media field 142 (step S4), and outputs a drive reservation error flag to the open processing unit 15.

Receiving the flag, the open processing unit 15 outputs a request to release the media identifier "3" to the media management unit 13, and outputs a file open error flag to the network control unit 18.

Receiving the request to release, the media management unit 13 returns the media use flag of media identifier "3" to the unsed state, i.e., "0" (step S8). At this point of time, the content of the media management table 130 returns to FIG. 3(*a*).

On the other hand, receiving the file open error flag, the network control unit 18 posts that the requested motion picture cannot be reproduced, through the network 19 and the network transfer unit 21 to the terminal PC 20 (step S9).

As described above, even though a motion picture file for which a request to start reading is issued is stored in an optical disk being not used for reading another file, when there is no unused disk drive, this request is rejected. Therefore, interruption of motion pictures being reproduced is avoided.

As described above, according to the first embodiment of the invention, the media management unit 13 and the drive management unit 14 manage whether or not the optical disks and the disk drives in the optical disk library 11 are being used for reading motion pictures. When an optical disk containing a motion picture file for which a request to start reading is issued is not being used and there is an unused disk drive, reading of the motion picture file is carried out. When the optical disk containing the motion picture file requested is being used or there is no unused disk drive, the request to start reading is rejected. So, when the terminal PC 20 issues a request to read a motion picture file on an optical disk being used or a request to read a motion picture file when all the disk drives are being used, these requests are rejected. Therefore, when a single motion picture file is recorded on a single optical disk, interruption of motion pictures being reproduced is avoided. Further, even when a single motion picture file is recorded over plural optical disks, interruption of motion pictures being reproduced due to scramble for disk drives is reduced.

Further, in this first embodiment, whether or not the optical disks and the disk drives are being used for reading motion pictures is detected by start/end of reading data of motion picture files. When an optical disk containing a motion picture file for which a request to start reading is issued is not used and there is an unused disk drive, reading of the motion picture file requested is carried out. When the optical disk containing the motion picture file requested is being used or when there is no unused disk drive, the request to start reading is rejected. Therefore, it is possible to implement, using software, a multimedia data reproduction apparatus capable of reducing interruption of motion pictures being reproduced.

[Embodiment 2]

The structure of a multimedia data reproduction apparatus according to a second embodiment of the invention is identical to the structure shown in FIG. 1 according to the first embodiment. The apparatus according to this second embodiment is different from the apparatus according to the first embodiment in the following respects. That is, each optical disk drive (reproduction unit) in the optical disk library 11 is able to read data of three motion pictures simultaneously from an optical disk mounted on the drive. The media management unit 13 stores the number of motion picture files being read from each optical disk, and the open processing unit 15 decides whether to accept a request to start reading or reject it, according to the number of motion picture files.

FIGS. 5(*a*)–5(*c*) are schematic diagrams showing a media management table 130 managed by the media management unit 13. FIG. 5(*a*) shows the state of table 130 at a certain point of time, wherein three motion picture files of media identifier "1" and two motion picture files of media identifier "3" are being read. The state of FIG. 5(*a*) changes, with time, to the state of FIG. 5(*b*) where a motion picture file of media identifier "2" goes into "being read", and the state of FIG. 5(*b*) changes to the state of FIG. 5(*c*) where another motion picture file of media identifier "3" goes into "being read". In these figures, the same reference numerals as those shown in FIGS. 3(*a*) and 3(*b*) designate the same or corresponding parts. Reference numeral 133 designates a media use count field showing the number of motion picture files being read from each optical disk. The media management unit 13 manages the number of motion picture files being read from each optical disk using the management table 130.

FIGS. 6(*a*) and 6(*b*) are schematic diagrams showing a drive management table 140 managed by the drive management unit 14. FIG. 6(*a*) shows the state of table 140 at a certain point of time. The state of FIG. 6(*a*) changes, with time, to the state of FIG. 6(*b*) where the disk drive of drive identifier "2" goes into "being used" for reading motion pictures from the optical disk of media identifier "2". In the figures, the same reference numerals as those shown in FIGS. 4(*a*)–4(*c*) designate the same or corresponding parts.

Figure 16:
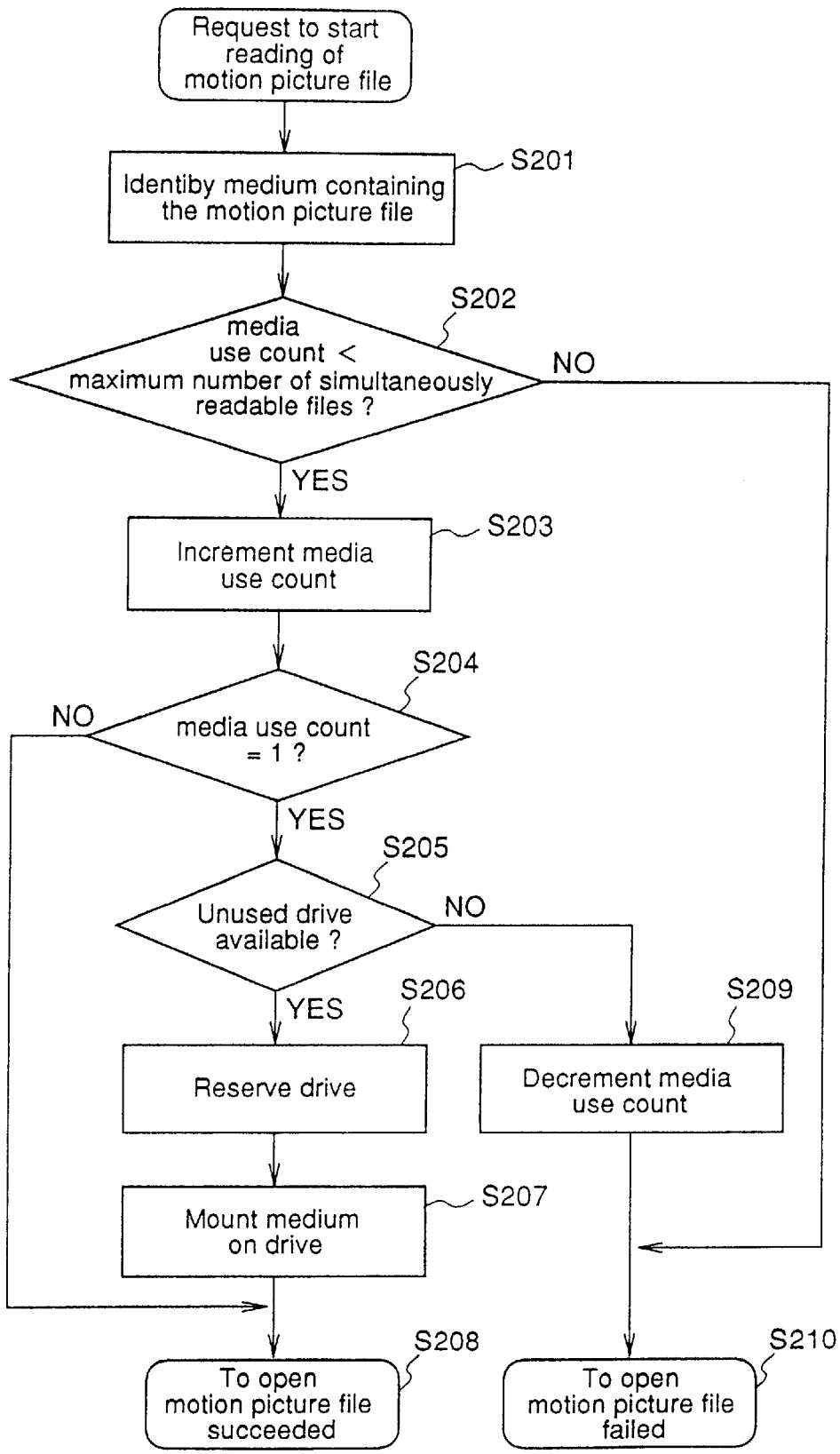
FIG. 16 is a flowchart for explaining open processing of the multimedia data reproduction apparatus according to the second embodiment of the invention.
Figure 17:
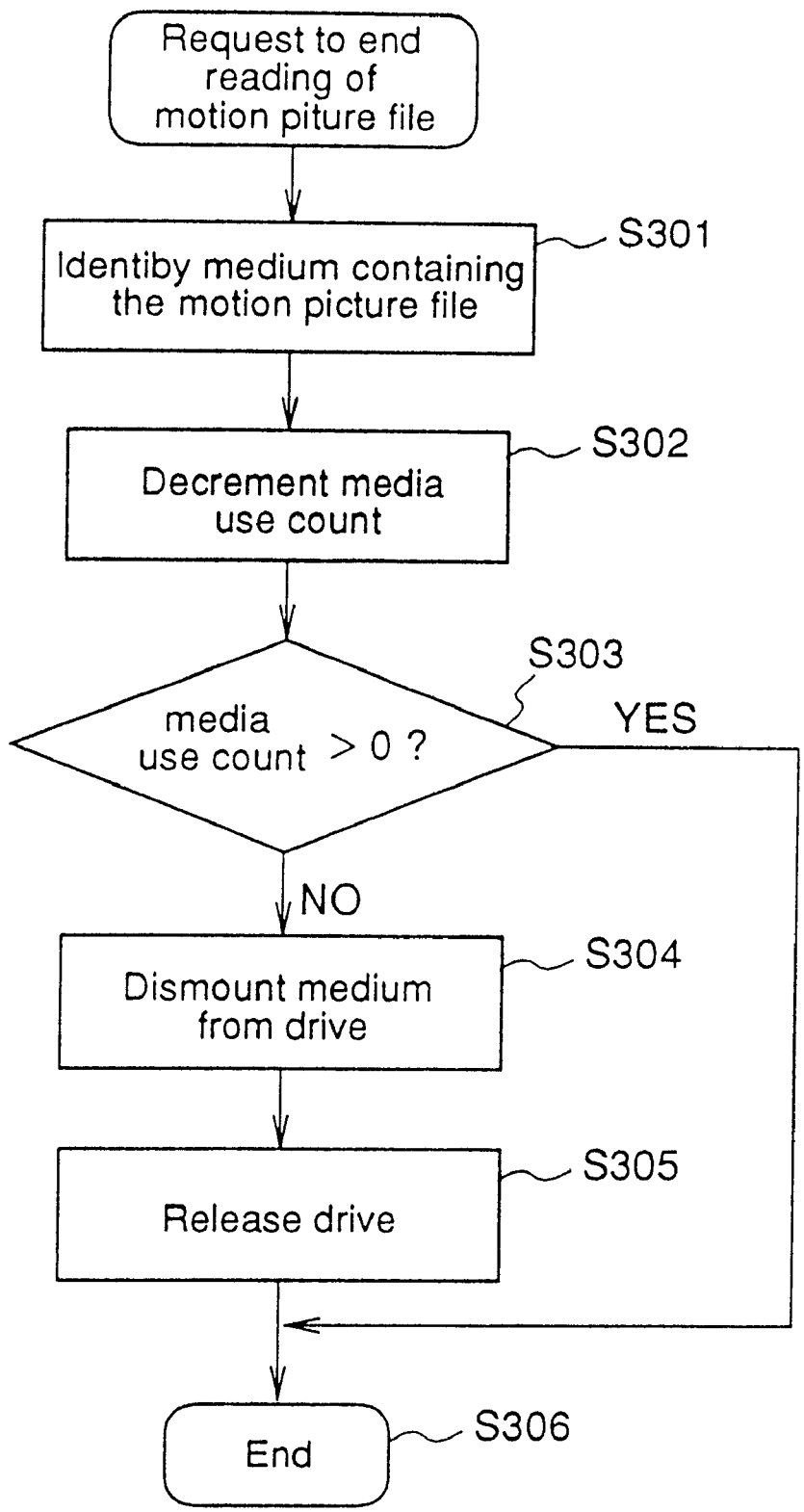
FIG. 17 is a flowchart for explaining close processing of the multimedia data reproduction apparatus according to the second embodiment of the invention.

A description is now given of the operation of the multimedia data reproduction unit so constructed, with reference to FIGS. 1, 2, 4(*a*)–4(*c*), 5(*a*)–5(*c*), 6(*a*), 6(*b*), 16 and 17. FIGS. 16 and 17 are flowcharts showing open processing and close processing of the multimedia data reproduction apparatus according to the second embodiment, respectively.

In the optical disk library 11, as shown in FIG. 5(a), three motion picture files are currently being read from the optical disk of media identifier "1", and two motion picture files are currently being read from the optical disk of media identifier "3". No motion picture files are being read from the optical disks of media identifiers "2" and "4". As shown in FIG. 6(a), the disk drive of drive identifier "1" reads the motion pictures from the optical disk of media identifier "3", and the disk drive of drive identifier "3" reads the motion pictures from the optical disk of media identifier "1".

Initially, a description is given of the case where the terminal PC 20 issues a request to read the motion picture file "Video1" stored in the optical disk from which three motion picture files are already being read.

The terminal PC 20 sends a request to read the motion picture file "Video1", through the network transfer unit 21 and the network 19 to the network control unit 18 of the multimedia data reproduction apparatus 1.

Receiving the request, the network control unit 18 issues a request to open the motion picture file "Video1" to the open processing unit 15.

Receiving the open request, the open processing unit 15 inquires the media identifier containing the motion picture file "Video1" to the file management unit 12. The file management unit 12 examines the file management table 120, discovers that the motion picture file "Video1" is stored in the optical disk of media identifier "1" (step S201), and outputs "1" to the open processing unit 15.

Receiving the output, the open processing unit 15 inquires whether the optical disk of media identifier "1" is available or not to the media management unit 13. The media management unit 13 examines the media management table 130, and obtains the media use count "3" of the media identifier "1".

Since each disk drive is able to read three motion pictures simultaneously from one optical disk in this second embodiment, the media management unit 13 decides that it is impossible to read a new motion picture from the optical disk of media identifier "1" (step S202) and outputs a media unavailable flag to the open processing unit 15.

Receiving the media unavailable flag, the open processing unit 15 outputs a file open error flag to the network control unit 18.

Receiving the file open error flag, the network control unit 18 posts that the motion picture requested cannot be reproduced, through the network 19 and the network transfer unit 21 to the terminal PC 20 (step S210).

As described above, when there is a new request to read a motion picture file stored in an optical disk which is already being used for reading of motion pictures as many as the maximum number of simultaneously readable (reproducible) motion picture files, this request is rejected.

Next, a description is given of the case where the terminal PC 20 issues a request to start reading of tho motion picture file "Video2" stored in the optical disk from which no motion picture file is currently being read.

In this case, initially, the terminal PC 20 sends a request to start reading of the motion picture file "Video2" through the network transfer unit 21 and the network 19 to the network control unit 18 of the multimedia data reproduction apparatus 1.

Receiving the request, the network control unit 18 issues a request to open the motion picture file "Video2" to the open processing unit 15.

Receiving the open request, the open processing unit 15 inquires the media identifier containing the motion picture file "Video2" to the file management unit 12. The file management unit 12 examines the file management table 120, discovers that the motion picture file "Video2" is stored in the optical disk of media identifier "2" (step S201), and outputs "2" to the open processing unit 15.

Receiving the output, the open processing unit 15 inquires whether the optical disk of media identifier "2" is available or not to the media management unit 13. The media management unit 13 examines the media management table 130, obtains the media use count "0" of the media identifier "2", and decides that it is possible to read a new motion picture from the optical disk of media identifier "2" (step S202). Then, the media management unit 13 increments the media use count corresponding to the media identifier "2" in the media used count field 133 (step S203), and outputs a media available flag and the media use count "1" after the increment, to the open processing unit 15. At this point of time, the content of the media management table 130 is as shown in FIG. 5(b).

Receiving the media available flag, the open processing unit 15 decides that a disk drive for reading file optical disk has not been reserved yet because the media use count is "1" (step S204), and outputs a request to reserve a disk drive for reading the optical disk of media identifier "2" to the drive management unit 14.

Receiving the request, the drive management unit 14 examines the drive management table 140, discovers that the disk drives of drive identifiers "2" and "4" are not currently being used (step S205), and decides to reserve the disk drive of drive identifier "2"0 for the optical disk of media identifier "2". Then, the drive management unit 14 writes "2" in the drive use media field 142 of the drive identifier "2" (step S206) and commands the disk changer to mount the optical disk of media identifier "2" on the disk drive of drive identifier "2" (step S207). Thereafter, the drive management unit 14 outputs a drive reservation completion flag to the open processing unit 15. At this point of time, the content of the drive management table 140 is as shown in FIG. 6(b).

Receiving the drive reservation completion flag, the open processing unit 15 outputs a file open completion flag to the network control unit 18. Thereafter, the network control unit 18 reads data of the motion picture file "Video2" recorded on the optical disk of media identifier "2" in the optical disk library 11 through the data readout controller 17 using the disk drive of drive identifier "2", and sends the data through the network 19 and the network transfer unit 21 to the terminal PC 20 (step S208).

As described above, when there is an unused disk drive, a request to start reading of a motion picture file stored in an optical disk which is not being used for reading of motion pictures is accepted.

Next, a description is given of the case where the terminal PC 20 issues a request to read the motion picture file "Video5" stored in the optical disk from which motion picture files are currently being read, but the number of the motion pictures does not reach the maximum number of simultaneously readable motion picture files.

In this case, the terminal PC 20 sends a request to start reading of motion picture file "Video5" through the network transfer unit 21 and the network 19 to the network control unit 18.

Receiving the request, the network control unit 18 issues a request to open the motion picture file "Video5" to the open processing unit 15.

Receiving the open request, the open processing unit 15 inquires the media identifier containing the motion picture file "Video5" to the file management unit 12. The file management unit 12 examines the file management table 120, discovers that the motion picture file "Video5" is stored in the optical disk of media identifier "3" (step S201 ), and outputs "3" to the open processing unit 15.

Receiving the output, the open processing unit 15 inquires whether the optical disk of media identifier "3" is available or not to the media management unit 13. The media management unit 13 examines the media management table 130, obtains the media use count "2" of the media identifier "3", and decides that it is possible to read a new motion picture from the optical disk of media identifier "3" (step S202). Then, the media management unit 13 increments the media use count corresponding to the media identifier "3" in the media used count field 133 (step S203), and outputs a media available flag and the media use count "3" after the increment, to the open processing unit 15. At this point of time, the content of the media management table 130 is as shown in FIG. 5(c).

Receiving the media available flag, the open processing unit 15 decides that the optical disk is currently used for reading of other motion picture files in the disk drive because the media use count is "3" (step S204), and outputs a file open completion flag to the drive management unit 14. In this case, the open processing unit 15 does not output a request to reserve a disk drive.

Thereafter, the network control unit 18 reads data of the motion picture file "Video5" recorded on the optical disk of media identifier "3" in the optical disk library 11 through the data readout controller 17 using the disk drive of drive identifier "1", and sends the data through the network 19 and the network transfer unit 21 to the terminal PC 20 (step S208).

As described above, even though an optical disk is already being used for reading of motion pictures, when the number of the motion pictures does not reach the maximum number of simultaneously readable motion picture files, a new request to read a motion picture file from the optical disk is accepted.

Further, since the disk drive is already secured, the request to start reading is not rejected for the reason that an unused disk drive is unavailable.

Next, a description is given of the case where, in this state, the terminal PC 20 ends reproduction of the motion picture file "Video5".

In this case, initially, the PC 20 sends a request to end reading of the motion picture file "Video5" through the network transfer unit 21 and the network 19 to the network control unit 18.

Receiving the request, the network control unit 18 issues a request to close the motion picture file "Video5" to the close processing unit 16.

Receiving the request, the close processing unit 16 inquires the media identifier containing the motion picture file "Video5" to the file management unit 12. The file management unit 12 examines the file management table 120, discovers that the motion picture file "Video5" is stored in the optical disk of media identifier "3" (step S301), and outputs "3" to the close processing unit 16.

Receiving the output, the close processing unit 16 outputs a request to release the optical disk of media identifier "3" to the media management unit 13. The media management unit 13 decrements the media use count corresponding to the media identifier "3" in the media use count field 133 (step S302), whereby the media use count of the media identifier "3" becomes "2". At this point of time, the content of the media management table 130 returns to FIG. 5(b).

When the media use count of the media identifier "3" becomes "2", the close processing unit 16 decides that the optical disk is still being used for reading of motion pictures (step S303), and ends this processing without outputting a request to release the disk drive (step S304).

As described above, when the terminal PC 20 ends reproduction of a motion picture file, if the optical disk containing the motion picture file is still being used for reading of other motion pictures, the number of the motion pictures being read is decreased, but the disk drive is not released.

Next, a description is given of the case where, in this state, the terminal PC 20 ends reproduction of the motion picture file "Video2".

In this case, initially, the terminal PC 20 sends a request to end reading of the motion picture file "Video2" through the network transfer unit 21 and the network 19 to the network control unit 18.

Receiving the request, the network control unit 18 issues a request to close the motion picture file "Video2" to the close processing unit 16.

Receiving the request, the close processing unit 16 inquires the media identifier containing the motion picture file "Video2" to the file management unit 12. The file management unit 12 examines the file management table 120, discovers that the motion picture file "Video2" is stored in the optical disk of media identifier "2" (step S301), and outputs "2" to the close processing unit 16.

Receiving the output, the close processing unit 16 outputs a request to release the optical disk of media identifier "2" to the media management unit 13. Receiving the request, the media management unit 13 decrements the media use count corresponding to the media identifier "2" in the media use count field 133 (step S302), whereby the media use count of the media identifier "2" becomes "0". At this point of time, the content of the media management table 130 returns to FIG. 5(a).

When the media use count of the media identifier "2" becomes "0", the close processing unit 16 decides that there is no motion picture file being read from this optical disk (step S303), and outputs a request to release the disk drive that has been used for reading of the optical disk of media identifier "2", to the drive management unit 14.

Receiving the request, the drive management unit 14 commands the disk changer to dismount the optical disk of media identifier "2" from the disk drive of drive identifier "2" and return the disk to where it was stored (step S304). Thereafter, the drive management unit 14 sets the drive use media corresponding to the drive identifier "2" in the drive use media field 142 on the drive management table 140 to "0" (step S305), whereby the disk drive of the drive identifier "2" goes into the unused state (step S306). At this point of time, the content of the drive management table 140 returns to the state of FIG. 6(a).

As described above, when the terminal PC 20 ends reproduction of a motion picture file, if the optical disk containing the motion picture file is not being used for reading of other motion pictures, the optical disk and disk drive which have been used are released.

Next, a description is given of the case where all of the disk drives are being used for reproduction of motion pictures.

It is assumed that the terminal PC 20 issues a request to read the motion picture file "Video2" stored in the optical disk from which no motion picture file is currently being read, and the drive management table 140 of the drive management unit 14 is in the state of FIG. 4(c).

In this case, the process steps from the terminal PC's outputting a request to start reading of "Video2" to the open processing unit's outputting a request to reserve a disk drive for the optical disk of media identifier "2" to the drive management unit 14 are identical to those mentioned above.

Receiving the request to reserve a disk drive from the open processing unit 15, the drive management unit 14 examines the drive management table 140. Since there exists no media identifier "0" in the drive use media field 142, the management unit 14 discovers that all the disk drives are currently being used (step S205), and outputs a drive reservation error flag to the open processing unit 15.

Receiving the drive reservation error flag, the open processing unit 15 outputs a request to release the optical disk of the media identifier "2" to the media management unit 13, and outputs a file open error flag to the network control unit 18. The network control unit 18 posts that the motion picture requested cannot be reproduced, through the network 19 and the network transfer unit 21 to the terminal PC 20 (step S210).

On the other hand, receiving the request to release, the media management unit 13 decrements the media use count of the media identifier "2" (step S209). At this point of time, the content of the media management table 130 returns to FIG. 5(*a*).

As described above, even though a requested motion picture file is stored in an optical disk being not used for reading of motion pictures, when there is no unused dish drive, the request to start reading of the motion picture data is rejected, whereby undesired interruption of motion pictures being reproduced is avoided.

As described above, in the multimedia data reproduction apparatus according to the second embodiment of the invention, each disk drive is able to simultaneously read plural motion picture files from a single optical disk mounted, and the number of motion picture files currently being read from the optical disk is managed. A request to start reading of a motion picture file is accepted when motion picture files stored in an optical disk containing the requested motion picture file are not being read at all and an unused disk drive is available or when some of the motion picture files in the optical disk are being read but the number of the motion picture files being read does not reach the maximum number of simultaneously readable motion picture files by the disk drive. However, the request to start reading of a motion picture file is rejected when there is no unused disk drive even though motion picture files in the optical disk containing the requested motion picture file are not being read at all or when the number of the motion picture files being read from the optical disk is equal to the maximum number of simultaneously readable motion picture files. Therefore, when the terminal PC 20 outputs a new request to read a motion picture file exceeding the maximum number of simultaneously readable motion picture files or exceeding the number of disk drives possessed by the optical disk library 11, this request is rejected. So, when a single motion picture file is recorded on a single optical disk, interruption of motion pictures being reproduced is avoided. Further, when a single motion picture file is recorded over plural optical disks, interruption of motion pictures being reproduced due to scramble for disk drives is reduced. Furthermore, even when the optical disk containing the requested motion picture file is already being used, reading of the requested motion picture file is carried out as long as the number of motion pictures files being read from the disk is less than the number of simultaneously readable motion picture files, the frequency of rejecting the request to start reading is reduced as compared with the apparatus according to the first embodiment that rejects the request to start reading when the optical disk is being used.

[Embodiment 3]

The structure of a multimedia data reproduction apparatus according to a third embodiment of the invention is shown by the block diagram of FIG. 1. The apparatus according to this third embodiment is different from the apparatus according to the second embodiment in the following respects. That is, in the optical disk library 11, each optical disk drive (reproduction unit) is able to simultaneously read plural motion pictures, for example, three motion pictures, from a single optical, disk mounted on the drive, and a single motion picture file is recorded over plural optical disks, for example, five disks. The file management unit 12 manages which motion picture file is recorded over which optical disks. The media management unit 13 manages the number of motion picture files being read from each optical disk. The open processing unit 15 decides whether a request to start reading of a motion picture file is accepted or not, considering the number of motion picture files being read from each optical disk and all of the optical disks over which the requested motion picture file is recorded.

FIG. 7 is a schematic diagram showing a file management table managed by the file management unit 12 according to the third embodiment of the invention. In FIG. 7, the same reference numerals as those shown in FIG. 2 designate the same or corresponding parts. Reference numeral 123 designates a media identifier field showing media identifiers of all optical disks in the optical disk library 11, in which motion picture files "Video1"~"Video7" . . . are recorded. The file management unit 12 manages which motion picture file is recorded over which optical disks, using the management table 120.

FIGS. 8(*a*)–8(*d*) are schematic diagrams showing a media management table 130 managed by the media management unit 13, at different points of time. FIG. 8(*a*) shows the table 130 at a certain point of time. The state of FIG. 8(*a*) changes to the state of FIG. 8(*b*) where a motion picture file of media identifier "4" goes into "being read". The state of FIG. 8(*b*) changes to the state of FIG. 8(*c*) where motion picture files of media identifiers "1" and "3" being read are increased each by one. The state of FIG. 8(*c*) changes to the state of FIG. 8(*d*) where a motion picture file of media identifier "5" goes into "being read". The media management table 130 according to this third embodiment is similar to the media management table according to the second embodiment and, in FIGS. 8(*a*)–8(*d*), the same reference numerals as those in FIGS. 5(*a*)–5(*c*) designate the same or corresponding parts. Reference numeral 134 designates a media reservation count field corresponding to the media use count field 133 shown in FIGS. 5(*a*)–5(*c*).

Figures 9, 10:
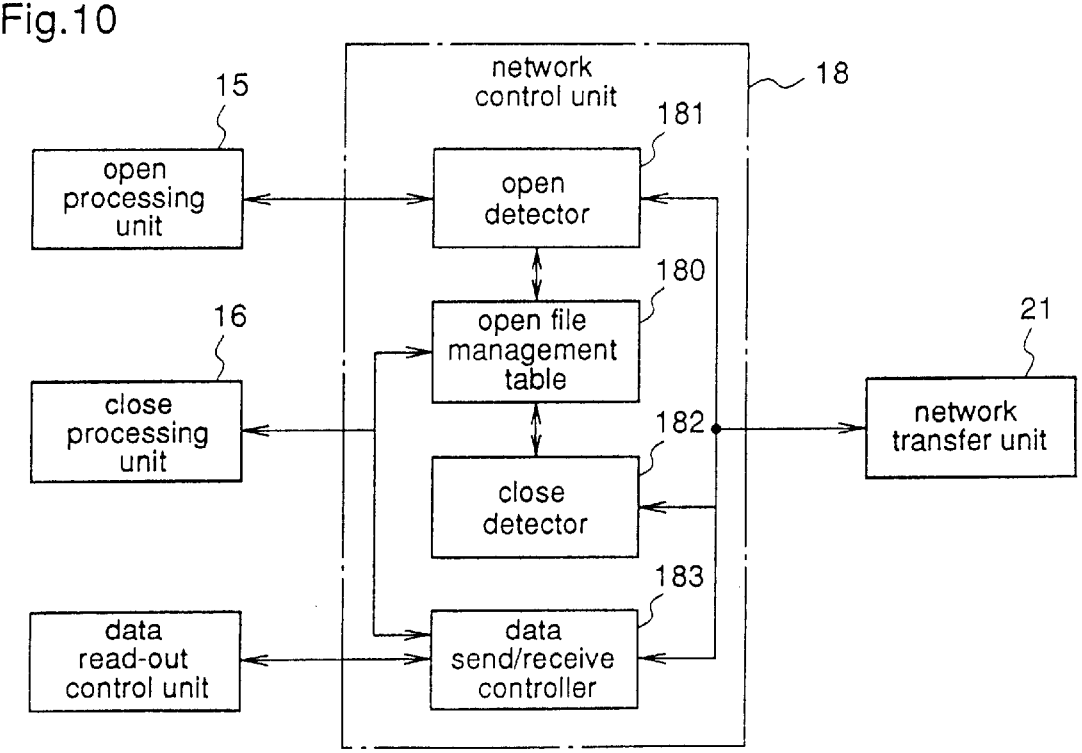
FIG. 10 is a block diagram illustrating a network control unit of a multimedia data reproduction apparatus according to a fourth embodiment of the invention.

FIGS. 9(*a*) and 9(*b*) are schematic diagrams illustrating a drive management table managed by the drive management unit 14, at different points of time. The state of FIG. 9(*a*) changes to the state of FIG. 9(*b*) where the disk drive of drive identifier "4" goes into "being used" for reading a motion picture file from the optical disk of media identifier "4". The drive management table according to this third embodiment is similar to the drive management table according to the first embodiment shown in FIGS. 4(*a*)–4(*c*) and, in FIGS. 9(*a*) and 9(*b*), the same reference numerals as those in FIGS. 4(*a*)–4(*c*) designate the same or corresponding parts.

A description is now given of the operation of the multimedia data reproduction apparatus so constructed, using FIGS. 1, 7, 8(*a*)–8(*d*), 9(*a*), 9(*b*), 18 and 19.

Figure 18:
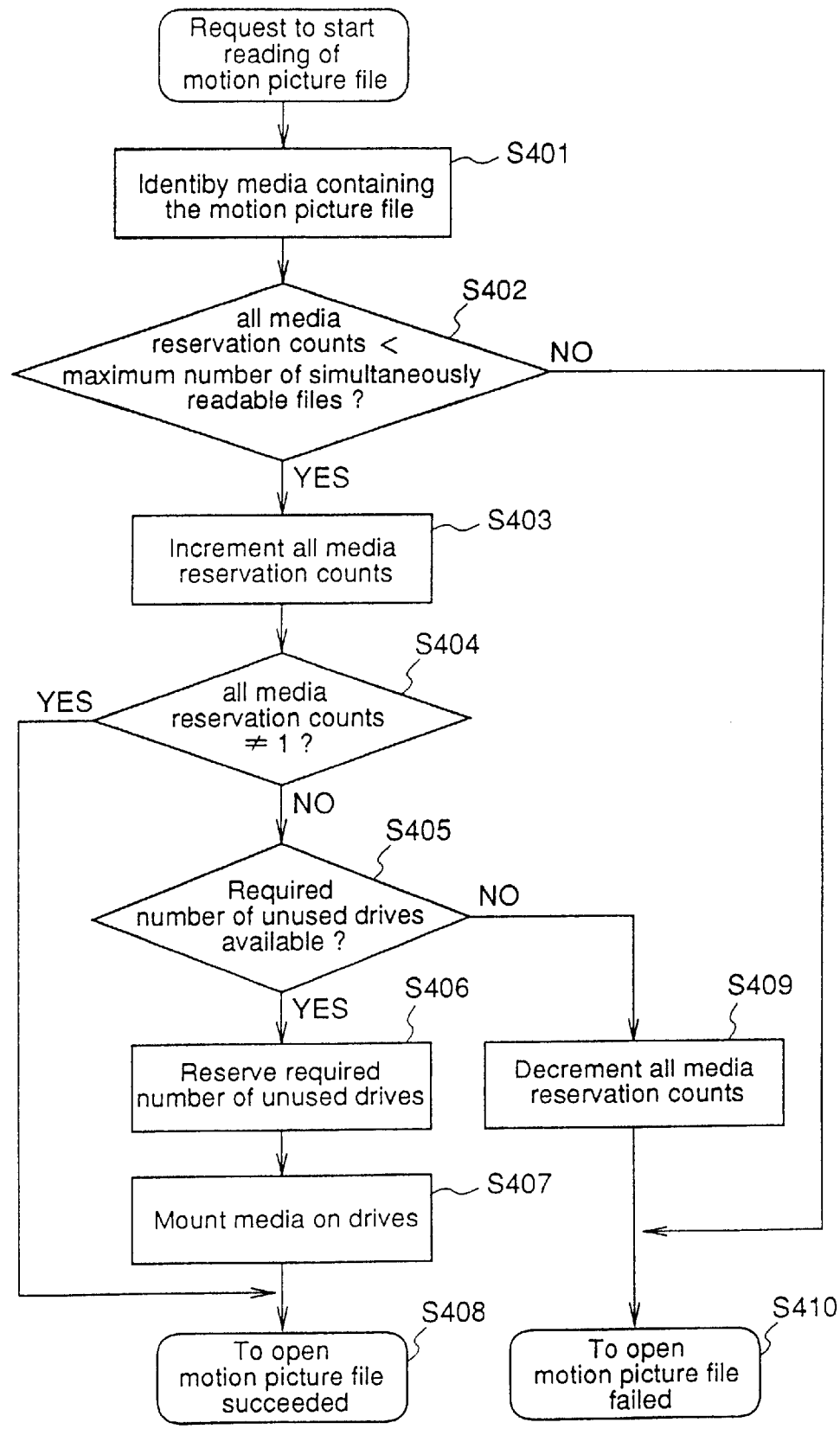
FIG. 18 is a flowchart for explaining open processing of the multimedia data reproduction apparatus according to the third embodiment of the invention.
Figure 19:
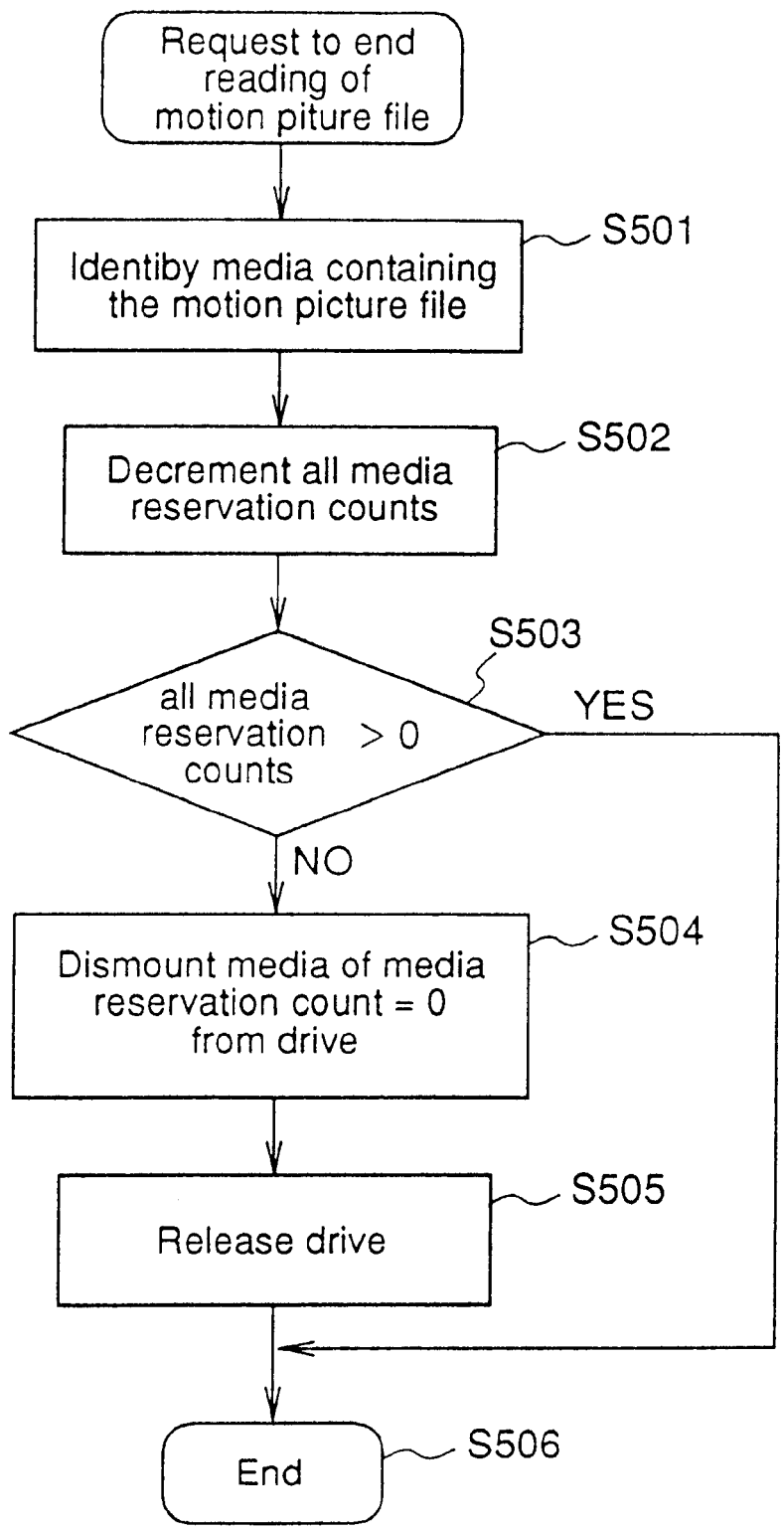
FIG. 19 is a flowchart for explaining close processing of the multimedia data reproduction apparatus according to the third embodiment of the invention.

FIGS. 18 and 19 are flowcharts showing open processing and close processing of the multimedia data reproduction apparatus according to the third embodiment, respectively.

In the optical disk library 11, as described in the file management table 120 shown in FIG. 7, a motion picture file "Video1" is stored in optical disks of media identifiers "1" and "2", a motion picture file "Video2" is stored in optical disks of media identifiers "1", "2" and "3", a motion picture file "Video3" is stored in optical disks of media identifiers "2" and "3", a motion picture file "Video4" is stored in an optical disk of media identifier "4", a motion picture file "Video5" is stored in optical disks of media identifiers "1" and "3", a motion picture file "Video6" is stored in optical disks of media identifiers "1" and "4", and a motion picture file "Video7" is stored in an optical disk of media identifier "5". It is assumed that three motion picture files "Video1", "Video2" and "Video3" are currently being read.

In this case, the media management table 130 managed by the media management unit 13 is in the state of FIG. 8(*a*). That is, the optical disks of media identifiers "1" and "3" are reserved for reproduction of two motion pictures, and the optical disk of media identifier "2" is reserved for reproduction of three motion pictures equal to the maximum number of simultaneously readable motion picture files from each optical disk. Further, the optical disks of media identifiers "4" and "5" are not reserved for reproduction of motion pictures. This is because, in this third embodiment, a single motion picture file is recorded over plural optical disks. For example, the motion picture file "Video1" is recorded over two optical disks of media identifiers "1" and "2", and one of the two disks is used when the motion picture file is reproduced. However, since it cannot be decided in advance when motion picture data stored in which optical disk is used, it is necessary to reserve read bands of both the optical disks of media identifiers "1" and "2".

Further, it is assumed that the drive management table 140 managed by the drive management unit 14 is currently in the state of FIG. 9(*a*). In FIG. 9(*a*), the disk drive of drive identifier "1" reads data of the optical disk of media identifier "1", the disk drive of drive identifier "2" reads data of the optical disk of media identifier "2", and the disk drive of drive identifier "3" reads data of the optical disk of media identifier "3".

First of all, a description is given of the case where the terminal PC 20 issues a request to start reading of the motion picture file "Video4" stored in a single optical disk which is not being used for reproduction of motion pictures.

In this case, the terminal PC 20 sends a request to start reading of the motion picture file "Video4", through the network transfer unit 21 and the network 19 to the network control unit 18.

Receiving the request, the network control unit 18 issues a request to open the motion picture file "Video4" to the open processing unit 15.

Receiving the open request, the open processing unit 15 inquires the media identifier containing the motion picture file "Video4" to the file management unit 12. The file management unit 12 examines the file management table 120, discovers that the motion picture file "Video4" is stored in the optical disk of media identifier "4" (step S401), and outputs "4" to the open processing unit 15.

Receiving the output, the open processing unit 15 inquires whether the optical disk of media identifier "4" is available or not to the media management unit 13. The media management unit 13 examines the media management table 130, obtains the media reservation count "0" of the media identifier "4", and decides that it is possible to read a new motion picture from the optical disk of media identifier "4" (step S402). Then, the media management unit 13 increments the media reservation count corresponding to the media identifier "4" in the media reservation count field 134 (step S403), and outputs a media available flag and the media reservation count "1" of the media identifier "4" after the increment to the open processing unit 15. At this point of time, the content of the media management table 130 is as shown in FIG. 8(*b*).

Receiving the media available flag, the open processing unit 15 decides that a disk drive for reading the optical disk of media identifier "4" is not reserved yet, from the media reservation count of media identifier "4" being "1" (step S404), and outputs a request to reserve a disk drive for reading the optical disk of media identifier "4" to the drive management unit 14.

Receiving the request, the drive management unit 14 examines the drive management table 140, discovers that the disk drive of drive identifier "4" is not being used (step S405), and decides to reserve the disk drive of drive identifier "4" for the optical disk of media identifier "4". Then, the drive management unit 14 writes "4" in the drive use media corresponding to the drive identifier "4" in the drive use media field 142 (step S406). Thereafter, the drive management unit 14 commands the disk changer to mount the optical disk of media identifier "4" on the disk drive of drive identifier "4" (step S407), and outputs a drive reservation completion flag to the open processing unit 15. At this point of time, the content of the drive management table 140 is as shown in FIG. 9(*b*).

Receiving the drive reservation completion flag, the open processing unit 15 outputs a file open completion flag to the network control unit 18. Thereafter, the network control unit 18 reads data of the motion picture file "Video4" recorded on the optical disk of media identifier "4" in the optical disk library 11 through the data readout controller 17 using the disk drive of drive identifier "4", and sends the data through the network 19 and the network transfer unit 21 to the terminal PC 20 (step S408).

As described above, when an unused disk drive is available, a request to start reading of a motion picture file stored in a single optical disk being not used for reproduction of motion pictures is accepted.

Next, a description is given of the case where the terminal PC 20 issues a request to start reading of the motion picture file "Video5" recorded over plural optical disks and, from each optical disk containing "Video5", motion picture files less than the maximum number of simultaneously readable motion picture files are being read.

In this case, the terminal PC 20 sends a request to start reading of the motion picture file "Video5" through the network transfer unit 21 and network 19 to the network control unit 18, and the network control unit 18 issues a request to open the motion picture file "Video5" to the open processing unit 15.

Receiving the open request, the open processing unit 15 inquires the media identifier containing the motion picture file "Video5" to the file management unit 12. The file management unit 12 examines the file management table 120, discovers that the motion picture file "Video5" is stored in the optical disks of media identifiers "1" and "3" (step S401), and outputs "1" and "3" to the open processing unit 15.

Receiving the output, the open processing unit 15 inquires whether the optical disks of media identifiers "1" and "3" are available or not to the media management unit 13. The media management unit 13 examines the media management table 130, obtains the media reservation count "2" of media identifier "1" and the media reservation count "2" of media identifier "3", and decides that both of the optical disks of media identifiers "1" and "3" can be reserved for reproduction of new motion pictures (step S402). Then, the media management unit 13 increments the media reservation counts of media identifiers "1" and "3" in the media reservation count field 134 (step S403), and outputs a media available flag, the media reservation count "3" of media identifier "1" after the increment, and the media reservation count "3" of media identifier "3" after the increment toward the open processing unit 15. At this point of time, the content of the media management table 130 is as shown in FIG. 8(c).

Receiving the media available flag, the open processing unit 15 decides that disk drives for reading these optical disks are already reserved as each of the media reservation counts of media identifiers "1" and "3" is not "1" (step S404), and outputs a file open completion flag to the network control unit 18. Thereafter, the network control unit 18 reads data of the motion picture file "Video5" recorded on the optical disk of media identifier "1" or "3" in the optical disk library 11 through the data readout controller 17 using the disk drive of drive identifier "1" or "3", and sends the data through the network 19 and the network transfer unit 21 to the terminal PC 20 (step S408).

As described above, even when a motion picture file is recorded over plural optical disks and these optical disks are already being used for reproduction of motion pictures, as long as the number of motion pictures being reproduced from each disk is less than the maximum number of simultaneously readable motion picture files, a request to start reading of the motion picture file is accepted.

Next, a description is given of the case where the terminal PC 20 issues a request to start reading of the motion picture file "Video6" stored over plural optical disks and, from at least one of the optical disks containing "Video6", motion picture files as many as the maximum number of simultaneously readable motion picture files are already being read.

In this case, the terminal PC 20 sends a request to start reading of the motion picture file "Video6" through the network transfer unit 21 and the network 19 to the network control unit 18, and the network control unit 18 issues a request to open the motion picture file "Video6" to the open processing unit 15.

Receiving the open request, the open processing unit 15 inquires the media identifier containing the motion picture file "Video6" to the file management unit 12. The file management unit 12 examines the file management table 120, discovers that the motion picture file "Video6" is stored in the optical disks of media identifiers "1" and "4" (step S401), and outputs "1" and "4" to the open processing unit 15.

Receiving the output, the open processing unit 15 inquires whether the optical disks of media identifiers "1" and "4" are available or not to tho media management unit 13. The media management unit 13 examines the media management table 130, and obtains the media reservation count "3" of media identifier "1" and the media reservation count "1" of media identifier "4". Since the maximum number of motion picture files simultaneously readable from a single optical disk is three in this third embodiment, the media management unit 13 decides that the optical disk of media identifier "1" cannot be reversed for reproduction of a new motion picture (step S402) and outputs a media unavailable flag to the open processing unit 15.

Receiving the media unavailable flag, the open processing unit 15 outputs a file open error flag to the network control unit 18. The network control unit 18 posts that the requested motion picture cannot be reproduced, through the network 19 and the network transfer unit 21 to the terminal PC 20 (step S410).

As described above, when a motion picture file is stored over plural optical disks and, from at least one of these optical disks, motion pictures as many as the maximum number of simultaneously readable motion picture files are already being read, a request to start reading of the motion picture file is rejected.

Next, a description is given of the case where the terminal PC 20 issues a request to read the motion picture file "Video7" which needs a reservation for a disk drive when all of the disk drives are being used. The drive management table of the drive management unit 14 is in the state of FIG. 9(b).

In this case, the terminal PC 20 sends a request to start reading of the motion picture file "Video7" through the network transfer unit 21 and the network 19 to the network control unit 18, and the network control unit 18 issues a request to open the motion picture file "Video7" to the open processing unit 15.

Receiving the open request, the open processing unit 15 inquires the media identifier containing the motion picture file "Video7" to the file management unit 12. The file management unit 12 examines the file management table 120, discovers that the motion picture file "Video7" is stored in the optical disk of media identifier "5" (step S401), and outputs the media identifier "5" to the open processing unit 15.

Receiving the output, the open processing unit 15 inquires whether the optical disk of media identifier "5" is available or not to the media management unit 13. The media management unit 13 examines the media management table 130, obtains the media reservation count "0" of media identifier "5", and decides that a new motion picture file can be read from the optical disk of media identifier "5" (step S402). Then, the media management unit 13 increments the media reservation count corresponding to the media identifier "5" in the media reservation count field 134 (step S403), and outputs a media available flag and the media reservation count "1" of media identifier "5" after the increment to the open processing unit 15. At this point of time, the content of the media management table 130 is as shown in FIG. 8(d).

Receiving the media available flag, the open processing unit 15 decides that a disk drive for reading the optical disk of media identifier "5" is not reserved yet, from the media reservation count of media identifier "5" being "1" (step S404) and outputs a request to reserve a disk drive for reading the disk of media identifier "5" to the drive management unit 14.

Receiving the request, the drive management unit 14 examines the drive management table 140, decides that all of the disk drives are being used because the drive use media field 142 has no "0" (step S405), and outputs a drive reservation error flag to the open processing unit 15.

Receiving the drive reservation error flag, the open processing unit 15 outputs a request to release the optical disk of media identifier "5" to the media management unit 13, and outputs a file open error flag to the network control unit 18.

Receiving the request to release, the media management unit 13 decrements the media reservation count of media identifier "5" (step S409). At this point of time, the content of the media management table 130 returns to FIG. 8(c).

Receiving the file open error flag, the network control unit 18 posts that the requested motion picture cannot be reproduced, through the network 19 and the network transfer unit 21 to the terminal PC 20 (step S410).

As described above, even when an optical disk is available for reproduction of a motion picture requested, if a disk drive for reading data of the motion picture cannot be reserved, the request to start reading of the motion picture is rejected.

A description is given of the case where, in this state, the terminal PC 20 ends reproduction of the motion picture file "Video5".

In this case, the terminal PC 20 sends a request to end reading of the motion picture file "Video5" through the network transfer unit 21 and the network 19 to the network control unit 18. The network control unit 18 issues a request to close the motion picture file "Video5" to the close processing unit 16.

Receiving the close request, the close processing unit 16 inquires the media identifier containing the motion picture file "Video5" to the file management 12. The file management unit 12 examines the file management table 120, discovers that the motion picture file "Video5" is stored in the optical disks of media identifiers "1" and "3" (step S501), and outputs "1" and "3" to the close processing unit 16.

Receiving the output, the close processing unit 16 outputs a request to release the optical disks of media identifiers "1" and "3" to the media management unit 13.

Receiving the request to release, the media management unit 13 decrements the media reservation counts of media identifiers "1" and "3" on the media management table 130 (step S502), whereby the media use count of media identifier "1" becomes "2" and the media use count of media identifier "3" becomes "2". At this point of time, the content of the media management table 130 returns to FIG. 8(*b*).

Thereafter, the close processing unit 16 decides that motion picture files are still being read from the optical disks of media identifiers "1" and "3" because each of the media reservation counts of media identifiers "1" and "3" is not "0" (step S503), and ends this close processing (step S506).

As described above, even when reproduction of a motion picture is ended, if the optical disk containing the motion picture is still being used for reproduction of other motion pictures, decrement of the reservation count of the optical disk is carried out, but the disk drive is not released.

Next, a description is given of the case where, in this state, the terminal PC 20 ends reproduction of the motion picture file "Video4".

In this case, the terminal PC 20 sends a request to end reading of the motion picture file "Video4" through the network transfer unit 21 and the network 19 to the network control unit 18, and the network control unit 18 issues a request to close the motion picture file "Video4" to the close processing unit 16.

Receiving the close request, the close processing unit 16 inquires the media identifier containing the motion picture file "Video4" to the file management unit 12. The file management unit 12 examines the file management table 120, discovers that the motion picture file "Video4" is stored in the optical disk of media identifier "4" (step S501), and outputs the media identifier "4" to the close processing unit 16.

Receiving the output, the close processing unit 16 outputs a request to release the optical disk of media identifier "4" to the media management unit 13.

Receiving the request to release, the media management unit 13 decrements the media reservation count of media identifier "4" on the media management table 130 (step S502), whereby the media reservation count of media identifier "4" becomes "0". At this point of time, the content of the media management table 130 returns to FIG. 8(*a*).

Since the media reservation count of media identifier "4" becomes "0", the close processing unit 16 decides that no motion picture file is being read from the optical disk of media identifier "4" (step S503), and outputs a request to release the disk drive used for the optical disk of media identifier "4" to the drive management unit 14.

Receiving the request to release, the drive management unit 14 commands the disk changer to dismount the optical disk of media identifier "4" from the disk drive of drive identifier "4" and return the disk to where it was stored (step S504). Thereafter, the drive management unit 14 sets the drive use media corresponding to the drive identifier "4" in the drive use media field 142 on the drive management table 140 to "0" (step S505), whereby the disk drive of drive identifier "4" goes into the unused state (step S506 ). At this point of time, the content of the drive management table returns to FIG. 9(*a*).

As described above, when reproduction of a motion picture file is ended and no more motion pictures are read from the optical disk containing the motion picture file, the optical disk and the disk drive are released.

As described above, in the multimedia data reproduction apparatus according to the third embodiment of the invention, with respect to all optical disks containing a motion picture file for which a request to start reading is issued from the terminal PC 20, when the number of motion picture files being read (including reserved files) from each of the optical disks is less than the number of motion picture files that can be simultaneously read by the disk drive and there exists unused disk drives not less than the number of the optical disks which contain the requested motion picture file and from which no motion picture files are read, reading of the requested motion picture file is carried out. However, when the number of motion picture files being read from at least one of the optical disks containing the requested motion picture file exceeds the number of simultaneously readable motion picture files or when unused disk drives corresponding to the number of optical disks from which no motion picture files are read are not available, the request to start reading is rejected. That is, when the terminal PC 20 issues a request to start reading of a motion picture file recorded over plural optical disks, the request to start reading is rejected except when the number of motion picture files being read from each of the disks is less than the number of simultaneously readable motion picture files and there exists unused disk drives corresponding to the number of the optical disks from which no motion picture files are read. Therefore, even when a motion picture file is recorded over plural optical disks, interruption of the motion picture being reproduced is avoided.

[Embodiment 4]

The strucuure of a multimedia data reproduction apparatus according to a fourth embodiment of the invention is illustrated by the block diagram of FIG. 1, and it is different from the multimedia data reproduction apparatuses according to the first to third embodiments in the internal structure of the network control unit 18.

FIG. 10 is a block diagram showing the structure of the network control unit 18 according to this fourth embodiment.

In the figure, the same reference numerals as those shown in FIG. 1 designate the same or corresponding parts. Reference numeral 181 designates an open detector for detecting the start of reading a motion picture file, numeral 182 designates a close detector for detecting the end of reading a motion picture file, numeral 183 designates a data send/receive controller for controlling send/receive of network packets, and numeral 180 designates an open file management table for managing motion picture files being reproduced.

FIGS. 11(a)–11(d) are schematic diagrams showing an open file management table 180 imaged on a memory. FIG. 11(a) shows the table 180 at a certain point of time. FIG. 11(b) shows the state where a motion picture file "Video5" and an offset "1" are added to the state of FIG. 11(a). FIG. 11(c) shows the state where "1" is added as an offset of the motion picture file "Video5" to the state of FIG. 11(b). FIG. 11(d) shows the state where a motion picture file "Video1" and an offset "1" are added to the state of FIG. 11(c). In these figures, reference numeral 1801 designates a file identifier field showing file identifiers (file names) of motion picture files currently being read, and numeral 1802 designates an offset field showing offset values of motion picture data to be read after the respective motion picture files currently being read.

Next, the operation of the multimedia data reproduction apparatus so constructed will be described using FIGS. 1, 10, and 11(a)–11(d).

Initially, a description is given of the case where the terminal PC 20 reproduces the motion picture file "Video5".

It is assumed that the open file management table 180 is currently in the state of FIG. 11(a).

In order to reproduce the motion picture file "Video5", the terminal PC 20 sends a request to read head data of the motion picture file "Video5" (offset value=0, size=1 block), through the network transmission unit 21 and the network 19 to the network control unit 18 of the multimedia data reproduction apparatus.

Receiving the read request, the open detector 181 decides whether the read request is a request to read a new motion picture file or not according to the open file management table 180.

Since there is no file identifier corresponding to "Video5" in the file identifier field 1801 of the current open file management table 180 (FIG. 11(a)), the open detector 181 decides that this read request is a request to start reading of a new motion picture file "Video5", and sends a request to start reading of the motion picture file "Video5" to the open processing unit 15. Further, the open detector 181 adds "Video5" to the file identifier field 1801 of the open file management table 180, and writes an offset "1" equivalent to the size of the read request from the terminal PC 20 into the offset field 1802.

When the terminal PC 20 continues reproduction of the motion picture file "Video5", it is expected that a request to read the motion picture data of this offset value will come next. At this point of time, the content of the open file management table 180 is as shown in FIG. 11(b).

The subsequent operation is identical to those already mentioned for the first to third embodiments and, therefore, does not require repeated description.

However, when the open processing unit 15 sends a file open error back to the open detector 181, the open detector 181 deletes the entry of the file identifier "Video5" on the open file management table 180 to return the table 180 to the state of FIG. 11(a).

Next, a description is given of the case where the terminal PC 20 subsequently sends a request to read the second data of the motion picture file "Video5" (offset=1, size=1).

Receiving the read request, the open detector 181 examines the open file management table 180, and decides that this read request is a request to the motion picture file currently being read because the table 180 contains the file identifier "Video5" and the offset "1". So, the open detector 181 adds "1" to the offset corresponding to the file identifier "Video5" in the offset field 1802 of the open file management table 180. In this case, the open detector 181 does not output a request to start reading. At this point of time, the content of the open file management table 180 is as shown in FIG. 11(c).

Next, a description is given of the case where, in the state of FIG. 11(c), another terminal PC 20 sends a request to read head data of motion picture file "Video1" (offset=0, size=1).

Receiving the road request, the open detector 181 examines the open file management table 180. Since the offset of file identifier "Video1" on the table 180 is "100", the open detector 181 decides that this read request is a request from another terminal unit to start reading of the motion picture file currently being read, and outputs a request to start reading of "Video1" to the open processing unit 15.

Further, the open detector 181 adds another "Video1" in the file identifier field 1801 of the open file management table 180, and writes an offset "1" in the offset field 1802. At this point of time, the content of the open file management table 180 is as shown in FIG. 11(d).

However, when the open processing unit 15 sends a file open error back to the open detector 181, the open detector 181 deletes the newly added entry of the file identifier "Video1" on the open file management table 180 to return the table 180 to the state of FIG. 11(c).

Next, a description is given of the case where, in the state of FIG. 11(c), the terminal PC 20 ends reproduction of the motion picture file "Video5".

The terminal PC 20 does not send a request to end reading but stops the request to read data of the motion picture file "Video5".

Meanwhile, the close detector 182 monitors the requests to read motion picture files entered in the open file management table 180, and detects motion picture files for which read requests have not been issued for a prescribed period of time (in this fourth embodiment, 30 seconds). Accordingly, when 30 seconds has passed from the stop of the request to read the motion picture file "Video5", the close detector 182 deletes the entry of "Video5" on the open file management table 180 and issues a request to end reading of "Video5" to the close processing unit 16.

The subsequent operation is identical to those already described for the first to third embodiments.

As described above, even when the terminal PC 20 does not explicitly issue a request to start/end reading of a motion picture file, since the network control unit 18 detects the start/end, open processing and close processing required for preventing motion pictures from being interrupted are carried out.

Although in this fourth embodiment the network control unit 18 includes both the open detector 181 and the close detector 182, one of these detectors may be dispensed with.

As described above, according to the fourth embodiment of the invention, the network control unit 18 includes the open detector 181 that monitors requests to read motion picture files and issues a request to start reading of a motion picture file when receiving the first request to read the motion picture file. Therefore, when the terminal PC 20 requests to read a motion picture file, it is not necessary for the PC 20 to issue a request to start reading. As a result, it is possible to connect the multimedia data reproduction apparatus with the terminal PC 20 using a protocol that does not explicitly issue a request to start reading of a motion picture file.

Furthermore, the network control unit 18 includes the close detector 182 that monitors requests to read motion picture files from the respective terminal PCs 20 and issues a request to end reading of a motion picture file when the request to read the motion picture file is stopped for a prescribed period of time. Therefore, when the terminal PC 20 requests to end reading of a motion picture file, it is not necessary for the PC 20 to issue a request to end reading. As a result, it is possible to connect the multimedia data reproduction apparatus with the terminal PC 20 using a protocol that does not explicitly issue a request to end reading of a motion picture file.

NFS (network file system) protocol is known as a typical protocol that does not explicitly issue a request to start/end reading of a motion picture file.

[Embodiment 5]

The above-mentioned fourth embodiment of the invention has the following drawback. If the time for deciding "close" in the close processing unit is shortened, when the user temporarily stops reproduction of a motion picture file and resumes it, an unwanted process of once closing the file and then reopening it occurs, resulting in a problem that the response time to resume reproduction is lengthened. Conversely, if the time for deciding "close" is lengthened, when the user changes the motion picture file to be reproduced, it takes time to close the motion picture file which has been reproduced before the change, resulting in a problem that the start of reproducing a new motion picture file is delayed. This fifth embodiment of the invention is directed to solving these problems.

The structure of a multimedia data reproduction apparatus according to this fifth embodiment is illustrated by the block diagram of FIG. 1, and the internal structure of the network control unit 18 is illustrated by the block diagram of FIG. 10. The apparatus according to this fifth embodiment is identical to the apparatus according to the fourth embodiment except the structure of the close detector 182 in the network control unit 18.

Hereinafter, the operation of the multimedia data reproduction apparatus so constructed will be described using FIGS. 2 and 10.

It is assumed that motion picture files are stored in optical disks as shown in FIG. 2 and the terminal PC 20 starts reproduction of motion picture file "Video4" immediately after end of reproduction of motion picture file "Video1".

In this case, the process steps from the open detector's receiving a request to read head data of "Video4" from the terminal PC 20 to outputting a request to start reading of "Video4" to the open processing unit 15 are identical to those already described for the fourth embodiment.

Since 30 seconds has not passed from the stop of request to read data of motion picture file "Video1" when the request to start reading is output to the open processing unit 15, the close detector 182 does not issue a request to end reading of "Video1" to the close processing unit 16. Since the motion picture file "Video1" in the optical disk of media identifier "1" which also contains the motion picture file "Video4" is in the open state, the optical disk of media identifier "1" cannot be used, so that the open processing unit 15 sends an open error to the open detector 181.

In the fourth embodiment, receiving the open error, the open detector 181 posts that the motion picture file "Video4" cannot be reproduced to the terminal PC 20.

In this fifth embodiment, however, the open detector 181 requests the close detector 182 to change the reference time for deciding "close", i.e., 30 seconds, to 1 second and, after 1 second, it reissues a request to start reading of the motion picture file "Video4" to the open processing unit 15.

Since the close processing of the motion picture file "Video1" has been completed by the time the request to start reading is reissued, the request to start reading of the motion picture file "Video4" is accepted by the open processing unit 15.

The subsequent operation is identical to that already described for the fourth embodiment.

As described above, according to the fifth embodiment of the invention, when a request to start reading is rejected, the close detector 182 shortens the reference time for deciding "close" and, thereafter, the open detector 181 reissues the rejected request to start reading. Therefore, when the motion picture file to be requested for reading is changed in the same terminal PC 20, after the request to start reading is once rejected, the decision of "close" is executed with the reference time shortened. So, the time required for closing the motion picture file which has been read before the change depends on the interval of the requests to start reading and the shortened reference time, and the time for closing the motion picture file can be set regardless of the referent time for deciding the end of reading. Accordingly, by setting the reference time for deciding the end of reading sufficiently long and setting the shortened reference time sufficiently short, the response time for resuming reproduction of a motion picture file after the user's temporal stopping of reproduction is not lengthened, and reproduction of a new motion picture file can be started with no delay.

[Embodiment 6]

The structure of a multimedia data reproduction apparatus according to a sixth embodiment of the invention is illustrated by the block diagram of FIG. 1, and the inner structure of the network control unit 18 is illustrated by the block diagram of FIG. 10. The apparatus according to this sixth embodiment is identical to the apparatus according to the fourth embodiment except the open file management table 180 and the close detector 182 in the network control unit 18.

Figures 12, 13:
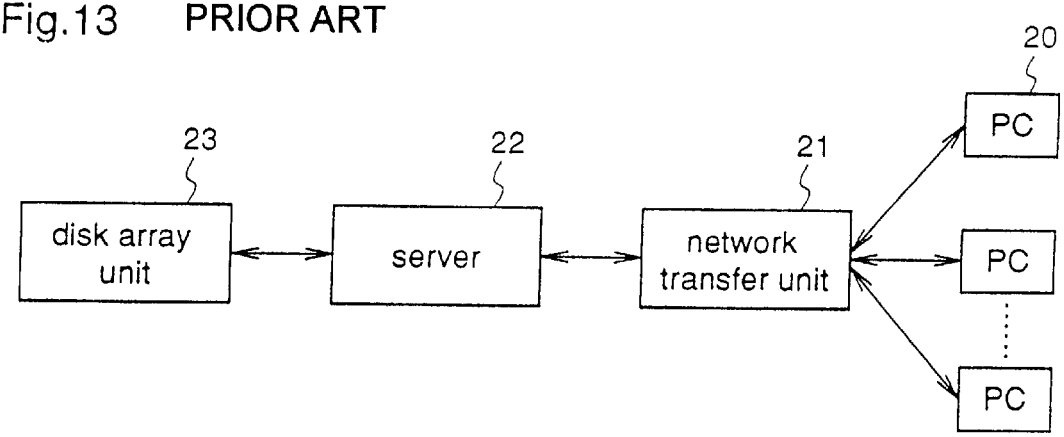
FIG. 12 is a schematic diagram illustrating an open file management table according to a sixth embodiment of the invention.
FIG. 13 is a block diagram illustrating a multimedia server system according to the prior art.

FIG. 12 is a schematic diagram illustrating the open file management table 180 according to the sixth embodiment. In FIG. 12, the same reference numerals as those shown in FIGS. 11(*a*)–11(*d*) designate the same or corresponding parts. The open file management table 180 has a terminal ID field 1803 in which terminal units reproducing the respective motion picture files in the open file name field 1801 are shown by terminal IDs, in addition to the open file name (file identifier) field 1801 and the offset field 1802.

Hereinafter, the operation of the multimedia data reproduction apparatus so constructed will be described using FIGS. 2, 10 and 12.

It is assumed that the respective motion picture files are stored in optical disks as shown in FIG. 2 and a terminal PC 20 of terminal ID "132.182.41.10" starts reproduction of motion picture file "Video4" immediately after the end of reproduction of motion picture file "Video1".

In this case, the process steps from the open detector's receiving a request to read head data of "Video4" from the terminal PC 20 to outputting a request to start reading of "Video4" to the open processing unit 15 are identical to those already described for the fourth embodiment.

In this sixth embodiment, the close detector 182 receives the request to read the head data of the motion picture file "Video4", and searches the open file management table 180 for an entry having a terminal ID that issues a request to read "Video4". When the table 180 has the entry, the close detector 182 issues a request to end reading of the motion picture file of the entry to the close processing unit 16.

To be specific, since there is an entry having a terminal ID "132.182.41.10" that issues a request to read "Video4", the close detector 182 issues a request to end reading of the motion picture file "Video1" to the close processing unit 16.

Since the close processing of the motion picture file "Video1" has been completed when it is decided whether the request to start reading of "Video4" issued from the open detector 181 is accepted or not by the open processing unit 15, the request to start reading of the motion picture file "Video4" is accepted.

The subsequent operation is identical to the operation already described for the fourth embodiment.

As described above, according to the sixth embodiment of the invention, when the motion picture file to be requested for reading is changed in the same terminal PC 20, since the end of reading is detected in accordance with the new request to read a motion picture file, unwanted rejection of the new request to start reading is avoided, which rejection is due to that the reference time for deciding "close" is set longer than the interval of read requests. Further, in the fifth embodiment of the invention, when changing motion picture files in the highly-loaded state, there is a possibility that the close processing might be performed to reproduction of a motion picture file of another terminal unit which is temporarily stopped. In this sixth embodiment, however, since the terminal units are separated, close/open processing is reliably carried out at the change. Further, since the terminal unit has no need to send the read request again, the response time at the change is shortened.

Although in the first embodiment of the invention software is employed to detect whether an optical disk or a disk drive is being used or not, it may be detected by hardware, for example, by setting a sensor. In this case, the open processing unit 15 detects only whether to accept a request to start reading of a motion picture file or reject it, and the close processing unit 16 is not required.

Although in the first to sixth embodiments the file management table 120 is formed in advance, when the apparatus is equipped with means of writing motion picture files in optical disks in the optical disk library 11, the content of the file management table 120 may be updated according to the writing in the optical disks.

Although in the first to third embodiments to return the optical disk disused to where it was stored in the optical disk library 11 is carried out when releasing the disk drive reserved, this may be carried out when a new optical disk is mounted on the reserved disk drive.

What is claimed is:

1. A multimedia data reproduction apparatus including a library unit which contains a plurality of recording media each having at least one multimedia title comprising a series of multimedia data, and at least one reproduction unit that mounts an arbitrary one of the recording media and reproduces multimedia data of a multimedia title of the recording medium, said apparatus being connected through a communication mediating means to a plurality of terminal units and, when receiving a request to read multimedia data of a multimedia title from an arbitrary one of the terminal units, said apparatus reading multimedia data of the requested multimedia title from a recording medium in the library unit using the reproduction unit and then transmitting the read data to the terminal unit that requests the multimedia title;

said apparatus including:

a file management unit managing which recording medium contains which multimedia title;

a media management unit managing whether each of the recording media is being used for reproduction of multimedia data;

a reproduction management unit managing which reproduction unit is being used for reproduction of multimedia data from which recording medium;

wherein, when a request to start reading of multimedia data of the requested multimedia title is issued, a recording medium containing the requested multimedia title is obtained from said file management unit, whether the obtained recording medium is being used for reproduction of multimedia data is obtained from said media management unit, and whether a reproduction unit not being used for reproduction of multimedia data is available is obtained from said reproduction unit management unit;

when the obtained recording medium is not being used and a reproduction unit not being used is available, reading of the multimedia data of the requested multimedia title is carried out; and when the obtained recording medium is being used or when a reproduction unit not being used is unavailable, the request to start reading is rejected, said file management unit storing information about which recording medium contains which multimedia title;

said media management unit storing information about whether each of the recording media is being used for reproduction of multimedia data; and said reproduction unit management unit storing information about which reproduction unit is being used for reproduction of multimedia data from which recording medium; and said apparatus further including:

an open processing unit which processes said request to start reading of multimedia data of the requested multimedia title in the following manner:

receiving the request to start reading, said open processing unit obtains a recording medium containing the requested multimedia title from said file management unit, obtains whether the obtained recording medium is being used for reproduction of multimedia data from said media management unit, and obtains whether a reproduction unit not being used for reproduction of multimedia data is available from said reproduction unit management unit;

when the obtained recording medium is not being used and a reproduction unit not being used is available, said open processing unit sets the obtained recording medium to "being used" in the storage of said media management unit and sets the unused reproduction unit to "being used" for the obtained recording medium in the storage of the reproduction unit management unit, and makes the reproduction unit perform reading of multimedia data of the requested multimedia title; and when the obtained recording medium is being used or when a reproduction unit not being used is unavailable, said open processing unit posts that the request to start reading is rejected; and a close processing unit which processes a request to end reading of multimedia data of the multimedia title in the following manner:

receiving the request to end reading, said close processing unit sets the recording medium containing the multimedia title for which the request to end reading is issued to "not used" in the storage of said media management unit, and sets the reproduction unit which has been used for reproduction of the recording medium to "not used" in the storage of the reproduction unit management unit.

2. A multimedia data reproduction apparatus as defined in claim 1, further including:

an open detector which monitors requests to read multimedia data of multimedia titles from the respective terminal units and, when there is a first request to read multimedia data of a multimedia title, issues a request to start reading of multimedia data of the multimedia title toward the open processing unit.

3. A multimedia data reproduction apparatus as defined in claim 2 further including:

a close detector which monitors requests to read multimedia data of multimedia titles from the respective terminal units and, when a request to read multimedia data of a multimedia title is stopped for a prescribed period of time, issues a request to end reading of multimedia data of the multimedia title toward the close processing unit.

4. A multimedia data reproduction apparatus as defined in claim 3 wherein, when said open processing unit posts that the request to start reading is rejected, said close detector shortens said period of time and, thereafter, said open detector reissues the rejected request to start reading.

5. A multimedia data reproduction apparatus as defined in claim 2 further including:

a close detector which monitors requests to read multimedia data of multimedia titles from the respective terminal units and performs as follows:

when a request to read multimedia data of a multimedia title is stopped for a prescribed period of time, said close detector issues a request to end reading of multimedia data of the multimedia title toward the close processing unit; and when a request to read multimedia data of a multimedia title from a terminal unit is changed to a request to read multimedia data of another multimedia title from the same terminal unit, said close detector issues a request to end reading of multimedia data of the multimedia title before the change toward the close processing unit.

6. A multimedia data reproduction apparatus as defined in claim 1, further including:

a close detector which monitors requests to read multimedia data of multimedia titles from the respective terminal units and, when a request to read multimedia data of a multimedia title is stopped for a prescribed period of time, issues a request to end reading of multimedia data of the multimedia title toward the close processing unit.

7. A multimedia data reproduction apparatus as defined in claim 1 further including:

a close detector which monitors request to read multimedia data of multimedia titles from the respective terminal units and performs as follows:

when a request to read multimedia data of a multimedia title is stopped for a prescribed period of time, said close detector issues a request to end reading of multimedia data of the multimedia title toward the close processing unit; and when a request to read multimedia data of a multimedia title from a terminal unit is changed to a request to read multimedia data of another multimedia title from the same terminal unit, said close detector issues a request to end reading of multimedia data of the multimedia title before the change toward the close processing unit.

8. A multimedia data reproduction apparatus including a library unit which contains a plurality of recording media each having at least one multimedia title comprising a series of multimedia data, and at least one reproduction unit that mounts an arbitrary one of the recording media and reproduces multimedia data of M pieces of multimedia titles simultaneously from the recording medium, said apparatus being connected through a communication mediating means to a plurality of terminal units and, when receiving a request to read a multimedia title from an arbitrary one of the terminal units, said apparatus reading multimedia data of the requested multimedia title from a recording medium in the library unit using the reproduction unit and transmitting the read data to the terminal unit that requests the multimedia title;

said apparatus being characterized by:

a file management unit storing information about which recording medium contains which multimedia title;

a media management unit storing N number of multimedia titles being used for reproduction of multimedia data from each recording medium;

a reproduction unit management unit storing information about which reproduction unit is being used for reproduction of multimedia data from which recording medium;

an open processing unit which processes a request to start reading of multimedia data of the requested multimedia title in the following manner:

receiving said request to start reading, said open processing unit obtains a recording medium containing the requested multimedia title from said file management unit, obtains the number N of multimedia titles being reproduced from the obtained recording medium from said media management unit, and obtains whether a reproduction unit not being used for reproduction of multimedia data is available from said reproduction unit management unit;

when the obtained recording medium is N=0 and a reproduction unit not being used is available, or when the obtained recording medium is $1 \leq N \leq (M-1)$, said open processing unit increments the number N of the multimedia titles being reproduced from the obtained recording medium in the storage of the media management unit and, especially when the obtained recording medium is N=0, said open processing unit sets the unused reproduction unit to "being used" for the obtained recording medium in the storage of the reproduction unit management unit, and makes the reproduction unit perform reading of multimedia data of the requested multimedia title; and when the obtained recording medium is N=0 and a reproduction unit not being used is unavailable or when the obtained recording medium is $N \geq M$, said open processing unit posts that the request to start reading is rejected; and a close processing unit which processes a request to end reading of multimedia data of the multimedia title in the following manner:

receiving the request to end reading, said close processing unit decrements the number N of the multimedia titles being reproduced from the recording medium containing the multimedia title for which the request to end reading is issued in the storage of said media management unit and, when the recording medium becomes N-0 as a result of the decrement, said close processing unit sets the reproduction unit that has been used for reproduction of the recording medium to "not used" in the storage of the reproduction unit management unit.

9. A multimedia data reproduction apparatus as defined in claim 8, further including:
an open detector which monitors requests to read multimedia data of multimedia titles from the respective terminal units and, when there is a first request to read multimedia data of a multimedia title, issues a request to start reading of multimedia data of the multimedia title toward the open processing unit.

10. A multimedia data reproduction apparatus as defined in claim 9 further including:
a close detector which monitors requests to read multimedia data of multimedia titles from the respective terminal units and, when a request to read multimedia data of a multimedia title is stopped for a prescribed period of time, issues a request to end reading of multimedia data of the multimedia title toward the close processing unit.

11. A multimedia data reproduction apparatus as defined in claim 10 wherein, when said open processing unit posts that the request to start reading is rejected, said close detector shortens said period of time and, thereafter, said open detector reissues the rejected request to start reading.

12. A multimedia data reproduction apparatus as defined in claim 9 further including:
a close detector which monitors requests to read multimedia data of multimedia titles from the respective terminal units and performs as follows;
when a request to read multimedia data of a multimedia title is stopped for a prescribed period of time, said close detector issues a request to end reading of multimedia data of the multimedia title toward the close processing unit; and
when a request to read multimedia data of a multimedia title from a terminal unit is changed to a request to read multimedia data of another multimedia title from the same terminal unit, said close detector issues a request to end reading of multimedia data of the multimedia title before the change toward the close processing unit.

13. A multimedia data reproduction apparatus as defined in claim 8, further including:
a close detector which monitors requests to read multimedia data of multimedia titles from the respective terminal units and, when a request to read multimedia data of a multimedia title is stopped for a prescribed period of time, issues a request to end reading of multimedia data of the multimedia title toward the close processing unit.

14. A multimedia data reproduction apparatus as defined in claim 3 further including:
a close detector which monitors requests to read multimedia data of multimedia titles from the respective terminal units and performs as follows:
when a request to read multimedia data of a multimedia title is stopped for a prescribed period of time, said close detector issues a request to end reading of multimedia data of the multimedia title toward the close processing unit; and
when a request to read multimedia data of a multimedia title from a terminal unit is changed to a request to read multimedia data of another multimedia title from the same terminal unit, said close detector issues a request to end reading of multimedia data of the multimedia title before the change toward the close processing unit.

15. A multimedia data reproduction apparatus including a library unit which contains a plurality of recording media each having at least one multimedia title comprising a series of multimedia data, and at least one reproduction unit that mounts an arbitrary one of the recording media and reproduces multimedia data of M pieces of multimedia titles simultaneously from the recording medium, said apparatus being connected through a communication mediating means to a plurality of terminal units and, when receiving a request to read a multimedia title from an arbitrary one of the terminal units, said apparatus reading multimedia data of the requested multimedia title from a recording medium in the library unit using the reproduction unit and transmitting the read data to the terminal unit that requests the multimedia title;

said apparatus being characterized by:
a file management unit storing information about which recording medium contains which multimedia title;
a media management unit storing the N number of multimedia titles being used for reproduction of multimedia data from each recording medium;
a reproduction unit management storing information about which reproduction unit is being used for reproduction of multimedia data from which recording medium;
an open processing unit which processes a request to start reading of multimedia data of the requested multimedia title in the following manner:
receiving said request to start reading, said open processing unit obtains all recording media containing the requested multimedia title from said file management unit, obtains the number N of multimedia titles being reproduced from each of the obtained recording media from said media management unit, and obtains the number of reproduction units being not used for reproduction of multimedia data from the reproduction unit management unit;
when all of the obtained recording media are $N \leq (M-1)$ and there are reproduction units not being used as many as or more than the number of the obtained recording media being N=0, said open processing unit increments the number N of the multimedia titles being reproduced from each of the obtained recording media in the storage of the media management unit, sets each of the unused reproduction units to "being used" for each of the recording media being N=0 in the storage of the reproduction unit management unit, and makes the reproduction units perform reading of multimedia data of the requested multimedia title; and
when there is at least one recording medium being $N \geq M$ or when there are no reproduction units not being used as many as the number of the recording media being N=0, said open processing unit posts that the request to start reading is rejected; and
a close processing unit which processes a request to end reading of multimedia data of the multimedia title in the following manner:
receiving the request to end reading, said close processing unit decrements the number N of the multimedia titles being reproduced from each of the recording media containing the multimedia title for which the request to end reading is issued in the storage of said media management unit and, when there are recording media being N=0 after the decrement, said close processing unit sets the reproduction units which have been used for reproduction of the recording media to "not used" in the storage of the reproduction unit management unit.

16. A multimedia data reproduction apparatus as defined in claim 15, further including:
an open detector which monitors requests to read multimedia data of multimedia titles from the respective terminal units and, when there is a first request to read multimedia data of a multimedia title, issues a request to start reading of multimedia data of the multimedia title toward the open processing unit.

17. A multimedia data reproduction apparatus as defined in claim 16 further including:
a close detector which monitors requests to read multimedia data of multimedia titles from the respective terminal units and, when a request to read multimedia data of a multimedia title is stopped for a prescribed period of time, issues a request to end reading of multimedia data of the multimedia title toward the close processing unit.

18. A multimedia data reproduction apparatus as defined in claim 17 wherein, when said open processing unit posts that the request to start reading is rejected, said close detector shortens said period of time and, thereafter, said open detector reissues the rejected request to start reading.

19. A multimedia data reproduction apparatus as defined in claim 16 further including:
a close detector which monitors requests to read multimedia data of multimedia titles from the respective terminal units and performs as follows:
when a request to read multimedia data of a multimedia title is stopped for a prescribed period of time, said close detector issues a request to end reading of multimedia data of the multimedia title toward the close processing unit; and
when a request to read multimedia data of a multimedia title from a terminal unit is changed to a request to read multimedia data of another multimedia title from the same terminal unit, said close detector issues a request to end reading of multimedia data of the multimedia title before the change toward the close processing unit.

20. A multimedia data reproduction apparatus as defined in claim 15, further including:
a close detector which monitors requests to read multimedia data of multimedia titles from the respective terminal units and, when a request to read multimedia data of a multimedia title is stopped for a prescribed period of time, issues a request to end reading of multimedia data of the multimedia title toward the close processing unit.

21. A multimedia data reproduction apparatus as defined in claim 15 further including:
a close detector which monitors requests to read multimedia data of multimedia titles from the respective terminal units and performs as follows:
when a request to read multimedia data of a multimedia title is stopped for a prescribed period of time, said close detector issues a request to end reading of multimedia data of the multimedia title toward the close processing unit; and
when a request to read multimedia data of a multimedia title from a terminal unit is changed to a request to read multimedia data of another multimedia title from the same terminal unit, said close detector issues a request to end reading of multimedia data of the multimedia title before the change toward the close processing unit.

22. A computer readable recording medium containing a program for reproducing multimedia data by a computer:
said program providing a multimedia data reproduction procedure using a library unit which contains a plurality of recording media each having at least one multimedia title comprising a series of multimedia data, and at least one reproduction unit that mounts an arbitrary one of the recording media and reproduces multimedia data of a multimedia title of the recording medium, wherein, when there is a request to read multimedia data of a multimedia title from an arbitrary one of the plural terminal units connected through a communication mediating means, multimedia data of the requested multimedia title are read from a recording medium in the library unit using the reproduction unit and then the read data are transmitted to the terminal unit that requests the multimedia title;
said procedure comprising:
a file management table managing which recording medium contains which multimedia title;
a media management table managing whether each of the recording media is being used for reproduction of multimedia data; and
a reproduction unit management table managing which reproduction unit is being used for reproduction of multimedia data from which recording medium;
wherein, when a request to start reading of multimedia data of the requested multimedia title is issued, a recording medium containing the requested multimedia title is obtained from said file management table, whether the obtained recording medium is being used for reproduction of multimedia data is obtained from said media management table, and whether a reproduction unit not being used for reproduction of multimedia data is available is obtained from said reproduction unit management table;
when the obtained recording medium is not being used and a reproduction unit not being used is available, reading of the multimedia data of the requested multimedia title is carried out; and
when the obtained recording medium is being used or when a reproduction unit not being used is unavailable, the request to start reading is rejected,
said multimedia data reproduction procedure including:
an open processing in which a request to start reading of multimedia data of the requested multimedia title is processed in the following manner:
when receiving said request to start reading, a recording medium containing the requested multimedia title is obtained from said file management table, whether the obtained recording medium is being used for reproduction of multimedia data is obtained from said media management table, and whether a reproduction unit not being used for reproduction of multimedia data is available from said reproduction unit management table;
when the obtained recording medium is not being used and a reproduction unit not being used is available, the obtained recording medium is set to "being used" in the management of said media management table, the unused reproduction unit is set to "being used" for the obtained recording medium in the management of the reproduction unit management table, and reading of multimedia data of the requested multimedia title is carried out; and
when the obtained recording medium is being used or when a reproduction unit not being used is unavailable, a notification that the request to start reading is rejected is posted; and a close processing in which a request to end reading of multimedia data of the multimedia title is processed in the following manner:

when receiving the request to end reading, the recording medium containing the multimedia title, for which the request to end reading is issued, is set to "not used" in the management of said media management table, and the reproduction unit which has been used for reproduction of the recording medium is set to "not used" in the management of the reproduction unit management table.

23. A computer readable recording medium containing a program for reproducing multimedia data by a computer:

said program providing a multimedia data reproduction procedure using a library unit which contains a plurality of recording media each having at least one multimedia title comprising a series of multimedia data, and at least one reproduction unit that mounts an arbitrary one of the recording media and reproduces multimedia data of M pieces of multimedia titles simultaneously from the recording medium, wherein, when there is a request to read multimedia data of a multimedia title from an arbitrary one of plural terminal units connected through a communication mediating means, multimedia data of the requested multimedia title are read from a recording medium in the library unit using the reproduction unit and then the read data are transmitted to the terminal unit that requests the multimedia title;

said procedure including:

a file management table managing which recording medium contains which multimedia title;

a media management table managing the number N of multimedia titles being used for reproduction of multimedia data from each recording medium; and a reproduction unit management table managing which reproduction unit is being used for reproduction of multimedia data from which recording medium;

an open processing in which a request to start reading of multimedia data of the requested multimedia title is processed in the following manner:

when receiving said request to start reading, a recording medium containing the requested multimedia title is obtained from said file management table, N number of multimedia titles being reproduced from the obtained recording medium is obtained from said media management table, and whether a reproduction unit being not used for reproduction of multimedia data is available is obtained from said reproduction unit management table;

when the obtained recording medium is N=0 and a reproduction unit not being used is available, or when the obtained recording medium is $1 \leq N \leq (M-1)$, the number N of the multimedia titles being reproduced from the obtained recording medium is incremented in the management of the media management table and, especially when the obtained recording medium is N=0, the unused reproduction unit is set to "being used" for the obtained recording medium in the management of the reproduction unit management table, and reading of multimedia data of the requested multimedia title is carried out; and when the obtained recording medium is N=0 and a reproduction unit not being used is unavailable or when the obtained recording medium is $N \geq M$, a notification that the request to start reading is rejected is issued; and a close processing in which a request to end reading of multimedia data of the multimedia title is processed in the following manner:

when receiving the request to end reading, the number N of the multimedia titles being reproduced from the recording medium containing the multimedia title, for which the request to end reading is issued, is decremented in the management of said media management table and, when the recording medium becomes N=0 as a result of the decrement, the reproduction unit that has been used for reproduction of the recording medium is set to "not used" in the management of the reproduction unit management table.

24. A computer readable recording medium containing a program for reproducing multimedia data by a computer:

said program providing a multimedia data reproduction procedure using a library unit which contains a plurality of recording media each having at least one multimedia title comprising a series of multimedia data, and at least one reproduction unit that mounts an arbitrary one of the recording media and reproduces multimedia data of M pieces of multimedia titles simultaneously from the recording medium, wherein, when there is a request to read multimedia data of a multimedia title from an arbitrary one of plural terminal units connected through a communication mediating means, multimedia data of the requested multimedia title are read from a recording medium in the library unit using the reproduction unit and then the read data are transmitted to the terminal unit that requests the multimedia title;

said procedure comprising:

a file management table managing which recording medium contains which multimedia title;

a media management table managing N number of multimedia titles being used for reproduction of multimedia data from each recording medium; and a reproduction unit management table managing which reproduction unit is being used for reproduction of multimedia data from which recording medium;

an open processing in which a request to start reading of multimedia data of the requested multimedia title is processed in the following manner:

when receiving said request to start reading, all recording media containing the requested multimedia title are obtained from said file management table, the number N of multimedia titles being reproduced from each of the obtained recording media is obtained from said media management table, and the number of reproduction units not being used for reproduction of multimedia data is obtained from the reproduction unit management table;

when all of the obtained recording media are $N \leq (M-1)$ and there are reproduction units not being used as many as or more than the number of the obtained recording media being N=0, the number N of the multimedia titles being reproduced front each of the obtained recording media is incremented in the management of the media management table, each of the unused reproduction units is set to "being used" for each of the recording media being N=0 in the management of the reproduction unit management table, and reading of multimedia data of the requested multimedia title is carried out; and when there is at least one recording medium being N≧M or when there are no reproduction units not being used as many as the number of the recording media being N=0, a notification that the request to start reading is rejected is issued; and a close processing in which a request to end reading of multimedia data of the multimedia title is processed in the following manner:

when receiving the request to end reading, the number N of the multimedia titles being reproduced from each of the recording media containing the multimedia title, for which the request to end reading issued, is decremented in the management of said media management table and, when there are recording media being N=0 after the decrement, the reproduction units which have been used for reproduction of the recording media are set to "not used" in the management of the reproduction unit management table.

25. A multimedia data reproduction method using a library unit which contains a plurality of recording media each having at least one multimedia title comprising a series of multimedia data, and at least one reproduction unit that mounts an arbitrary one of the recording media and reproduces multimedia data of a multimedia title of the recording medium, wherein, when there is a request to read multimedia data of a multimedia title from an arbitrary one of the plural terminal units connected through a communication mediating means, multimedia data of the requested multimedia title are read from a recording medium in the library unit using the reproduction unit and then transmitting the read data are transmitted to the terminal unit that requests the multimedia title;

said method comprising:

a file management table managing which recording medium contains which multimedia title;

a media management table managing whether each of the recording media is being used for reproduction of multimedia data; and a reproduction unit management table managing which reproduction unit is being used for reproduction of multimedia data from which recording medium;

wherein, when a request to start reading of multimedia data of the requested multimedia title is issued, a recording medium containing the requested multimedia title is obtained from said file management table, whether the obtained recording medium is being used for reproduction of multimedia data is obtained from said media management table, and whether a reproduction unit not being used for reproduction of multimedia data is available is obtained from said reproduction unit management table;

when the obtained recording medium is not being used and a reproduction unit not being used is available, reading of the multimedia data of the requested multimedia title is carried out; and when the obtained recording medium is being used or when a reproduction unit not being used is unavailable, the request to start reading is rejected, an open processing in which a request to start reading of multimedia data of the requested multimedia title is processed in the following manner:

when receiving said request to start reading, a recording medium containing the requested multimedia title from said file management table, whether the obtained recording medium is being used for reproduction of multimedia data is obtained from said media management table, and whether a reproduction unit not being used for reproduction of multimedia data is available is obtained from said reproduction unit management table;

when the obtained recording medium is not being used and a reproduction unit not being used is available, the obtained recording medium is set to "being used" in the management of said media management table, the unused reproduction unit is set to "being used" for the obtained recording medium in the management of the reproduction unit management table, and reading of multimedia data of the requested multimedia title is carried out; and when the obtained recording medium is being used or when a reproduction unit not being used is unavailable, a notification that the request to start reading is rejected is posted; and a close processing in which a request to end reading of multimedia data of the multimedia title is processed in the following manner:

when receiving the request to end reading, the recording medium containing the multimedia title, for which the request to end reading is issued, is set to "not used" in the management of said media management table, and the reproduction unit which has been used for reproduction of the recording medium is set to "not used" in the management of the reproduction unit management table.

26. A multimedia data reproduction method using a library unit which contains a plurality of recording media each having at least one multimedia title comprising a series of multimedia data, and at least one reproduction unit that mounts an arbitrary one of the recording media and reproduces multimedia data of M pieces of multimedia titles simultaneously from the recording medium, wherein, when there is a request to read multimedia data of a multimedia title from an arbitrary one of plural terminal units connected through a communication mediating means, multimedia data of the requested multimedia title are read from a recording medium in the library unit using the reproduction unit and then the read data are transmitted to the terminal unit that requests the multimedia title;

said method including:

a file management table managing which recording medium contains which multimedia title;

a media management table managing N number of multimedia titles being used for reproduction of multimedia data from each recording medium; and a reproduction unit management table managing which reproduction unit is being used for reproduction of multimedia data from which recording medium;

an open processing in which a request to start reading of multimedia data of the requested multimedia title is processed in the following manner:

when receiving said request to start reading, a recording medium containing the requested multimedia title is obtained from said file management table, the number N of multimedia titles being reproduced from the obtained recording medium is obtained from said media management table, and whether a reproduction unit not being used for reproduction of multimedia data is available is obtained from said reproduction unit management table;

when the obtained recording medium is N=0 and a reproduction unit not being used is available, or when the obtained recording medium is $1 \leq N \leq (M-1)$, the number N of the multimedia titles being reproduced from the obtained recording medium is incremented in the management of the media management table and, especially when the obtained recording medium is N=0, the unused reproduction unit is set to "being used" for the obtained recording medium in the management of the reproduction unit management table, and reading of multimedia data of the requested multimedia title is carried out; and when the obtained recording medium is N=0 and a reproduction unit not being used is unavailable or when the obtained recording medium is $N \geq M$, a notification that the request to start reading is rejected is issued; and a close processing in which a request to end reading of multimedia data of the multimedia title is processed in the following manner:

when receiving the request to end reading, the number N of the multimedia titles being reproduced from the recording medium containing the multimedia title, for which the request to end reading is issued, is decremented in the management of said media management table and, when the recording medium becomes N=0 as a result of the decrement, the reproduction unit that has been used for reproduction of the recording medium is set to "not used" in the management of the reproduction unit management table.

27. A multimedia data reproduction method using a library unit which contains a plurality of recording media each having at least one multimedia title comprising a series of multimedia data, and at least one reproduction unit that mounts an arbitrary one of the recording media and reproduces multimedia data of M pieces of multimedia titles simultaneously from the recording medium, wherein, when there is a request to read multimedia data of a multimedia title from an arbitrary one of plural terminal units connected through a communication mediating means, multimedia data of the requested multimedia title are read from a recording medium in the library unit using the reproduction unit and then the read data are transmitted to the terminal unit that requests the multimedia title;

said method comprising:

a file management table managing which recording medium contains which multimedia title;

a media management table managing N number of multimedia titles being used for reproduction of multimedia data from each recording medium; and a reproduction unit management table managing which reproduction unit is being used for reproduction of multimedia data from which recording medium;

an open processing in which a request to start reading of multimedia data of the requested multimedia title is processed in the following manner:

when receiving said request to start reading, all recording media containing the requested multimedia title are obtained from said file management table, the number N of multimedia titles being reproduced from each of the obtained recording media is obtained from said media management table, and the number of reproduction units not being used for reproduction of multimedia data is obtained from the reproduction unit management table;

when all of the obtained recording media are $N \leq (M-1)$ and there are reproduction units not being used as many as or more than the number of the obtained recording media being N=0, the number N of the multimedia titles being reproduced from each of the obtained recording media is incremented in the management of the media management table, each of the unused reproduction units is set to "being used" for each of the recording media being N=0 in the management of the reproduction unit management table, and reading of multimedia data of the requested multimedia title is carried out; and when there is at least one recording medium being $N \geq M$ or when there are no reproduction units not being used as many as the number of the recording media being N=0, a notification that the request to start reading is rejected is issued; and a close processing in which a request to end reading of multimedia data of the multimedia title is processed in the following manner:

when receiving the request to end reading, the number N of the multimedia titles being reproduced from each of the recording media containing the multimedia title, for which the request to end reading is issued, is decremented in the management of said media management table and, when there are recording media being N=0 after the decrement, the reproduction units which have been used for reproduction of the recording media are set to "not used" in the management of the reproduction.

* * * * *